(12) United States Patent
Fan

(10) Patent No.: US 6,981,839 B2
(45) Date of Patent: Jan. 3, 2006

(54) WIND POWERED TURBINE IN A TUNNEL

(76) Inventor: Leon Fan, 2707 Devonshire Dr., Carrollton, TX (US) 75007

( * ) Notice: Subject to any disclaimer, the term of this patent is extended or adjusted under 35 U.S.C. 154(b) by 141 days.

(21) Appl. No.: 10/796,369

(22) Filed: Mar. 9, 2004

(65) Prior Publication Data

US 2005/0201855 A1 Sep. 15, 2005

(51) Int. Cl.
*F03D 3/04* (2006.01)

(52) U.S. Cl. .......................... 415/4.1; 290/55
(58) Field of Classification Search ............. 415/4.1, 415/2.1, 905, 4.2, 4.4, 907, 202; 416/197 A, 416/DIG. 6; 290/55
See application file for complete search history.

(56) References Cited

U.S. PATENT DOCUMENTS

| 104,918 A | 6/1870 | Clair |
|---|---|---|
| 143,100 A | 9/1873 | Sheplar et al. |
| 175,530 A | 3/1876 | Vemor |
| 201,400 A | 3/1878 | Everhart |
| 231,253 A | 8/1880 | Austin |
| 274,541 A | 3/1883 | Zwiebel |
| 399,171 A | 3/1889 | Townsend |
| 410,360 A | 9/1889 | Ham |
| 416,170 A | 12/1889 | Kirby, Jr. |
| 419,435 A | 1/1890 | Goodyear |
| 434,108 A | 8/1890 | Gatlin |
| 455,858 A | 7/1891 | Pepper |
| 485,933 A | 11/1892 | Herman |
| 535,193 A | 3/1895 | Chapman |
| 537,494 A | 4/1895 | Stevens et al. |
| 578,759 A | 3/1897 | McElroy |
| 588,572 A | 8/1897 | Hardaway |
| 607,668 A | 7/1898 | Tinsley |
| 640,901 A | 1/1900 | Hardaway |
| 648,442 A | 5/1900 | Scott |
| 663,337 A | 12/1900 | Gemmill |
| 719,939 A | 2/1903 | Gwinn et al. |
| 764,571 A | 7/1904 | Fisher |
| 833,184 A | 10/1906 | Terzian |
| 923,698 A | 6/1909 | Perry |
| 932,253 A | 8/1909 | Daub |
| 973,823 A | 10/1910 | Stamm |
| 984,599 A | 2/1911 | Pichault |
| 993,120 A | 5/1911 | Stemer |

(Continued)

FOREIGN PATENT DOCUMENTS

DE 25 05 954 A1 8/1976

(Continued)

*Primary Examiner*—Edward K. Look
*Assistant Examiner*—Richard A. Edgar
(74) *Attorney, Agent, or Firm*—Slater & Matsil, L.L.P.

(57) ABSTRACT

A wind powered turbine has a conduit. A middle conduit portion is located between inlet and outlet conduit portions, having a main inlet and outlet of the conduit, respectively. A rotor having a shaft with blades extending therefrom is located in the middle conduit portion. The blades are located completely within the middle conduit portion. Preferably, a splitter is located in the inlet conduit portion to provide upper and lower sub-tunnels that both feed into the middle conduit portion. Upper and lower interior walls of the middle conduit portion have substantially circular plane shapes that are substantially centered at the rotational axis of the shaft. Upper and lower clearance gaps are located between the blades and the upper and lower interior walls, respectively. The main outlet is preferably higher than the main inlet. Preferably, a generator is located on each side of the conduit and rotatably coupled to the shaft.

32 Claims, 7 Drawing Sheets

U.S. PATENT DOCUMENTS

| | | |
|---|---|---|
| 997,802 A | 7/1911 | Geofroy |
| 1,002,833 A | 9/1911 | Giddings |
| 1,015,416 A | 1/1912 | Bennett |
| 1,062,099 A | 5/1913 | Hoglund |
| 1,075,994 A | 10/1913 | Serramoglla et al. |
| 1,233,232 A | 7/1917 | Heyroth |
| 1,234,405 A | 7/1917 | Solomon |
| 1,263,983 A | 4/1918 | Winne |
| 1,300,499 A | 4/1919 | Slagel |
| 1,313,457 A | 8/1919 | Bowman |
| 1,315,595 A | 9/1919 | Clark |
| 1,329,668 A | 2/1920 | Lee |
| 1,342,206 A | 6/1920 | Ellehammer |
| 1,345,022 A | 6/1920 | Oliver |
| 1,413,411 A | 4/1922 | Lloyd et al. |
| 1,433,995 A | 10/1922 | Fowle |
| 1,441,774 A | 1/1923 | Adams |
| 1,455,950 A | 5/1923 | Willman |
| 1,471,095 A | 10/1923 | Bonetto |
| 1,503,061 A | 7/1924 | Pendergast |
| 1,523,295 A | 1/1925 | Ryan |
| 1,533,467 A | 4/1925 | Sargent |
| 1,534,799 A | 4/1925 | Maine |
| 1,578,923 A | 3/1926 | Schlotter |
| 1,583,165 A | 5/1926 | Nicholson |
| 1,596,373 A | 8/1926 | Preston |
| 1,615,675 A | 1/1927 | Bender |
| 1,646,723 A | 10/1927 | Bonetto |
| 1,758,560 A | 5/1930 | Currie |
| 1,766,765 A | 6/1930 | Savonlus |
| 1,790,175 A | 1/1931 | Spencer |
| 1,820,818 A | 8/1931 | McRae |
| 1,835,018 A | 12/1931 | Darrieus |
| 1,851,513 A | 3/1932 | Holmstrom |
| 1,876,595 A | 9/1932 | Beldimano |
| 1,903,307 A | 4/1933 | Gillio |
| 1,935,097 A | 11/1933 | Nelson |
| 1,944,239 A | 1/1934 | Honnet |
| 1,958,145 A | 5/1934 | Jones |
| 2,007,963 A | 7/1935 | Cleveland |
| 2,067,542 A | 1/1937 | Penton |
| 2,068,792 A | 1/1937 | Dekker |
| 2,096,119 A | 10/1937 | Lensch et al. |
| 2,106,928 A | 2/1938 | Lee |
| 2,137,559 A | 11/1938 | Algee |
| 2,137,579 A | 11/1938 | Lundholm et al. |
| 2,153,523 A | 4/1939 | Roberts et al. |
| 2,169,149 A | 8/1939 | Johanson |
| 2,237,857 A | 4/1941 | Winderl |
| 2,294,009 A | 8/1942 | Umhoefer et al. |
| 2,335,817 A | 11/1943 | Topalov |
| 2,339,602 A | 1/1944 | Hagen |
| 2,358,781 A | 9/1944 | Albers |
| 2,379,324 A | 6/1945 | Topalov |
| 2,406,268 A | 8/1946 | Terhune |
| 2,407,816 A | 9/1946 | Czemer |
| 2,431,111 A | 11/1947 | Du Brie |
| 2,458,419 A | 1/1949 | Reinmann |
| 2,517,135 A | 8/1950 | Rudisill |
| 2,563,279 A | 8/1951 | Rushing |
| 2,653,754 A | 9/1953 | McDonald |
| 2,664,961 A | 1/1954 | Goede |
| 2,667,589 A | 1/1954 | Levrero |
| 2,701,526 A | 2/1955 | Rotkin |
| 3,059,834 A | 10/1962 | Hausammann |
| 3,128,939 A | 4/1964 | Szydlowski |
| 3,168,048 A | 2/1965 | Toyokura et al. |
| 3,192,712 A | 7/1965 | Nash et al. |
| 3,228,475 A | 1/1966 | Worthmann |
| 3,302,552 A | 2/1967 | Walsh |
| 3,339,078 A | 8/1967 | Crompton |
| 3,345,931 A | 10/1967 | Walsh |
| 3,346,174 A | 10/1967 | Lievens et al. |
| 3,561,883 A | 2/1971 | Berry |
| 3,645,192 A | 2/1972 | Rousey |
| 3,720,840 A | 3/1973 | Gregg |
| 3,730,643 A | 5/1973 | Davison |
| 3,820,916 A | 6/1974 | Agushev et al. |
| 3,883,750 A | 5/1975 | Uzzell, Jr. |
| 3,895,885 A | 7/1975 | Moyer |
| 3,902,072 A | 8/1975 | Quinn |
| 3,924,966 A | 12/1975 | Taminini |
| 3,942,909 A | 3/1976 | Yengst |
| 3,944,840 A | 3/1976 | Troll |
| 3,977,409 A | 8/1976 | Brendling |
| 3,994,621 A | 11/1976 | Bogie |
| 4,005,947 A | 2/1977 | Norton et al. |
| 4,012,163 A | 3/1977 | Baumgartner et al. |
| 4,017,204 A | 4/1977 | Sellman |
| 4,018,543 A | 4/1977 | Carson et al. |
| 4,021,135 A | 5/1977 | Pedersen et al. |
| 4,031,405 A | 6/1977 | Asperger |
| 4,036,916 A | 7/1977 | Agsten |
| 4,037,983 A | 7/1977 | Poeta |
| 4,039,848 A | 8/1977 | Winderl |
| 4,039,849 A | 8/1977 | Mater et al. |
| 4,045,144 A | 8/1977 | Loth |
| 4,047,832 A | 9/1977 | Sforza |
| 4,047,834 A | 9/1977 | Magoveny et al. |
| 4,055,950 A | 11/1977 | Grossman |
| 4,070,131 A | 1/1978 | Yen |
| 4,073,516 A | 2/1978 | Kling |
| 4,074,951 A | 2/1978 | Hudson |
| 4,075,500 A | 2/1978 | Oman et al. |
| 4,075,545 A | 2/1978 | Haberer |
| 4,076,448 A | 2/1978 | Sanders, Jr. |
| 4,079,264 A | 3/1978 | Cohen |
| 4,084,918 A | 4/1978 | Pavlecka |
| 4,086,026 A | 4/1978 | Tamanini |
| 4,088,419 A | 5/1978 | Hope et al. |
| 4,105,362 A | 8/1978 | Sforza |
| 4,111,594 A | 9/1978 | Sforza |
| 4,115,028 A | 9/1978 | Hintze |
| 4,116,581 A | 9/1978 | Bolie |
| 4,120,152 A | 10/1978 | Jackson, III |
| 4,127,356 A | 11/1978 | Murphy |
| 4,132,499 A | 1/1979 | Igra |
| 4,134,707 A | 1/1979 | Ewers |
| 4,140,433 A | 2/1979 | Eckel |
| 4,142,822 A | 3/1979 | Herbert et al. |
| 4,143,992 A | 3/1979 | Crook |
| 4,147,472 A | 4/1979 | Kling |
| 4,154,556 A | 5/1979 | Webster |
| 4,156,580 A | 5/1979 | Pohl |
| 4,162,410 A | 7/1979 | Amick |
| 4,164,382 A | 8/1979 | Mysels |
| 4,178,124 A | 12/1979 | Puskas |
| 4,179,007 A | 12/1979 | Howe |
| 4,182,594 A | 1/1980 | Harper et al. |
| 4,191,505 A | 3/1980 | Kaufman |
| 4,204,126 A | 5/1980 | Diggs |
| 4,204,795 A | 5/1980 | Forrest |
| 4,204,799 A | 5/1980 | de Geus |
| 4,213,057 A | 7/1980 | Are |
| 4,213,734 A | 7/1980 | Lagg |
| 4,224,528 A | 9/1980 | Argo |
| 4,236,083 A | 11/1980 | Kenney |
| 4,242,050 A | 12/1980 | Oakes |
| 4,254,843 A | 3/1981 | Han et al. |
| 4,258,271 A | 3/1981 | Chappell et al. |
| 4,260,325 A | 4/1981 | Cymara |
| 4,265,086 A | 5/1981 | Bahrenburg |
| 4,266,403 A | 5/1981 | Hirbod |
| 4,275,309 A | 6/1981 | Lucier |

| | | |
|---|---|---|
| 4,276,033 A | 6/1981 | Krovina |
| 4,278,896 A | 7/1981 | McFarland |
| 4,288,199 A | 9/1981 | Weisbrich |
| 4,288,200 A | 9/1981 | O'Hare |
| 4,288,704 A | 9/1981 | Bosard |
| 4,289,970 A | 9/1981 | Deibert |
| 4,291,235 A | 9/1981 | Bergey, Jr. et al. |
| 4,293,274 A | 10/1981 | Gilman |
| 4,302,684 A | 11/1981 | Gogins |
| 4,309,146 A | 1/1982 | Hein et al. |
| 4,315,713 A | 2/1982 | Verplanke |
| 4,323,331 A | 4/1982 | Schachle et al. |
| 4,324,985 A | 4/1982 | Oman |
| 4,330,714 A | 5/1982 | Smith |
| 4,340,822 A | 7/1982 | Gregg |
| 4,350,895 A | 9/1982 | Cook |
| 4,350,898 A | 9/1982 | Benoit |
| 4,350,900 A | 9/1982 | Baughman |
| 4,357,130 A | 11/1982 | Forrest |
| 4,359,311 A | 11/1982 | Benesh |
| 4,362,470 A | 12/1982 | Locastro et al. |
| 4,366,386 A | 12/1982 | Hanson |
| 4,369,629 A | 1/1983 | Lockwood |
| 4,379,972 A | 4/1983 | Sosa et al. |
| 4,396,843 A | 8/1983 | Martinez Parra |
| 4,398,096 A | 8/1983 | Faurholtz |
| 4,411,588 A | 10/1983 | Currah, Jr. |
| 4,421,452 A | 12/1983 | Rougemont |
| 4,428,711 A | 1/1984 | Archer |
| 4,443,155 A | 4/1984 | Smith |
| 4,447,738 A | 5/1984 | Allison |
| 4,449,887 A | 5/1984 | Mundhenke |
| 4,450,364 A | 5/1984 | Benoit |
| 4,461,957 A | 7/1984 | Jallen |
| 4,474,529 A | 10/1984 | Kinsey |
| 4,490,623 A | 12/1984 | Goedecke |
| 4,491,739 A | 1/1985 | Watson |
| 4,494,007 A | 1/1985 | Gaston |
| 4,498,017 A | 2/1985 | Parkins |
| 4,508,973 A | 4/1985 | Payne |
| 4,516,907 A | 5/1985 | Edwards |
| 4,525,633 A | 6/1985 | Wertheim et al. |
| 4,530,638 A | 7/1985 | Andruszkiw et al. |
| 4,543,041 A | 9/1985 | French et al. |
| 4,545,729 A | 10/1985 | Storm |
| 4,547,124 A | 10/1985 | Kliatzkin et al. |
| 4,571,152 A | 2/1986 | Tatar |
| 4,585,950 A | 4/1986 | Lund |
| 4,589,344 A | 5/1986 | Davison |
| 4,606,697 A | 8/1986 | Appel |
| 4,613,760 A | 9/1986 | Law |
| 4,616,973 A | 10/1986 | Souchik, Jr. |
| 4,619,585 A | 10/1986 | Storm |
| 4,648,787 A | 3/1987 | Brünig et al. |
| 4,652,206 A | 3/1987 | Yeoman |
| 4,678,923 A | 7/1987 | Trepanier |
| 4,684,817 A | 8/1987 | Goldwater |
| 4,700,081 A | 10/1987 | Kos et al. |
| 4,710,100 A | 12/1987 | Laing et al. |
| 4,715,776 A | 12/1987 | Benesh |
| 4,720,640 A | 1/1988 | Anderson et al. |
| 4,722,665 A | 2/1988 | Tyson |
| 4,764,683 A | 8/1988 | Coombes |
| 4,784,570 A | 11/1988 | Bond |
| 4,808,068 A | 2/1989 | Asbjornson et al. |
| 4,832,571 A | 5/1989 | Carrol |
| 4,838,757 A | 6/1989 | Benesh |
| 4,850,265 A | 7/1989 | Raisanen |
| 4,850,792 A | 7/1989 | Yeoman |
| 4,857,753 A | 8/1989 | Mewburn-Crook et al. |
| 4,859,140 A | 8/1989 | Passadore |
| 4,963,761 A | 10/1990 | Wight |
| 5,009,569 A | 4/1991 | Hector, Sr. et al. |
| 5,020,967 A | 6/1991 | Gual et al. |
| 5,035,611 A | 7/1991 | Neubecker et al. |
| 5,038,049 A | 8/1991 | Kato |
| 5,083,039 A | 1/1992 | Richardson et al. |
| 5,083,899 A | 1/1992 | Koch |
| 5,112,195 A | 5/1992 | Cox |
| 5,134,305 A | 7/1992 | Senehi |
| 5,137,417 A | 8/1992 | Lund |
| 5,140,170 A | 8/1992 | Henderson |
| 5,211,539 A | 5/1993 | McCarty |
| 5,299,913 A | 4/1994 | Heidelberg |
| 5,332,354 A | 7/1994 | Lamont |
| 5,350,273 A | 9/1994 | Hector, Sr. et al. |
| 5,380,149 A | 1/1995 | Valsamidis |
| 5,391,926 A | 2/1995 | Staley et al. |
| 5,447,412 A | 9/1995 | Lamont |
| 5,457,346 A | 10/1995 | Blumberg et al. |
| 5,463,257 A | 10/1995 | Yea |
| 5,472,311 A | 12/1995 | Davis |
| 5,506,453 A | 4/1996 | McCombs |
| 5,553,996 A | 9/1996 | Farrar |
| 5,599,172 A | 2/1997 | McCabe |
| 5,669,758 A | 9/1997 | Williamson |
| 5,709,419 A | 1/1998 | Roskey |
| 5,734,202 A | 3/1998 | Shuler |
| 5,758,911 A | 6/1998 | Gerhardt |
| 5,827,044 A | 10/1998 | Yazici et al. |
| 5,852,331 A | 12/1998 | Giorgini |
| 5,852,353 A | 12/1998 | Kochanneck |
| 5,895,201 A | 4/1999 | Huovinen |
| 5,910,688 A | 6/1999 | Li |
| 5,967,749 A | 10/1999 | Eaves et al. |
| 5,977,649 A | 11/1999 | Dahill |
| 5,992,341 A | 11/1999 | Gerhardt |
| 6,064,123 A | 5/2000 | Gislason |
| 6,069,409 A | 5/2000 | Fowler et al. |
| 6,126,385 A | 10/2000 | Lamont |
| 6,157,088 A | 12/2000 | Bendix |
| 6,158,953 A | 12/2000 | Lamont |
| 6,172,429 B1 | 1/2001 | Russell |
| 6,191,496 B1 | 2/2001 | Elder |
| 6,201,315 B1 | 3/2001 | Larsson |
| 6,246,126 B1 | 6/2001 | Van Der Veken et al. |
| 6,270,308 B1 | 8/2001 | Groppel |
| 6,309,172 B1 | 10/2001 | Gual |
| 6,320,273 B1 | 11/2001 | Nemec |
| 6,375,424 B1 | 4/2002 | Scarpa |
| 6,448,668 B1 | 9/2002 | Robitaille |
| 6,448,669 B1 | 9/2002 | Elder |
| 6,489,691 B1 | 12/2002 | Lang |
| 6,538,340 B2 | 3/2003 | Elder |
| 6,561,575 B2 | 5/2003 | Fairburn et al. |
| 6,638,005 B2 * | 10/2003 | Holter et al. ............... 415/4.2 |

FOREIGN PATENT DOCUMENTS

| | | |
|---|---|---|
| DE | 25 39 058 A1 | 3/1977 |
| DE | 26 20 862 A1 | 11/1977 |
| DE | 27 32 192 A1 | 1/1979 |
| DE | 196 15 943 A1 | 10/1997 |
| DE | 196 486 32 A1 | 4/1998 |
| FR | 2 277 250 | 1/1976 |
| FR | 2 446 391 | 8/1980 |
| FR | 2 472 093 | 6/1981 |
| GB | 2 041 457 A | 9/1980 |
| GB | 2 185 786 A | 7/1987 |
| JP | 52 001251 | 1/1977 |
| JP | 60 003500 | 1/1985 |
| SU | 1268792 A1 | 11/1986 |
| SU | 1278483 A2 | 12/1986 |

* cited by examiner

WIND POWERED TURBINE IN A TUNNEL

TECHNICAL FIELD

The present invention generally relates to wind powered turbines. In one aspect it relates more particularly to a wind powered turbine in a tunnel for use in electrical power generation.

BACKGROUND

Many have sought ways to capture and harness the kinetic energy contained within the wind for generating power, such as generating electricity. Since about 1700 B.C., the windmill has been used for generating power, such as providing rotational energy to drive a machine or to pump/move water. More recently, numerous inventions and designs were developed, tested, and some actually used for generating electricity from the wind's kinetic energy.

The kinetic energy contained in a unit cross-section area of wind flow is somewhat limited, e.g., as compared to water flow. To commercially adopt a wind powered electricity generator typically requires a very large scale device. Up to now, the only wind powered turbine that has been relatively successful for commercially generating electricity is the wind impeller. A typical wind impeller 20 is shown in FIG. 1, for example. A book entitled *Wind Power for Home & Business-Renewable Energy for* 1990 *and Beyond* by Paul Gipe provides a detailed description about using wind impellers as wind powered generators, for example. Most or all other wind powered generator designs failed to be used commercially due to overly complicated or complex structures. Due to the complicated structures of other prior designs, such wind powered generators are typically difficult to build in large scale and/or too expensive to build in large scale.

Most or all wind powered generators may be grouped into one of two categories in terms of the aerodynamic mechanism used to capture the wind's energy and drive the wind powered generator. The first category includes the wind impeller type of wind powered generator (see e.g., impeller 20 in FIG. 1). Wind impellers typically have a blades that rotate about an axis generally aligned with the wind flow direction. Such rotation axis is usually horizontal. The blades are typically arranged in a vertical plane that is generally perpendicular to the wind flow direction, and each blade is tilted to some degree towards the wind. When the wind flows against and across the blades, the wind pushes the blades with a force component similar to the lift force component on a helicopter blade, similar to a lift force component on an airplane wing, and/or similar to a propulsion force component on an airplane propeller, but in an opposite force direction. Besides the wind speed, the magnitude of the "lift" force exerted on each blade depends on the angle of the blade relative to the wind, the aerodynamic shape (cross-section shape) of the blade, and the size of the blade. There are many shortcomings to an impeller type design for a wind powered generator, including low efficiency, high noise, danger of exposed spinning blades (e.g., hazardous to birds), space requirements, and difficulty in selecting a suitable blade material for a given climate, for example.

The second category of wind powered generators includes the wind turbine type with the rotational axis being generally perpendicular to the wind flow direction. Such wind turbines typically have flat blades, angled blades, or curved blades. The rotational axis may be horizontal (see e.g., U.S. Pat. Nos. 1,300,499, 1,935,097, 4,017,204, 4,127,356, 4,191,505, 4,357,130, and 5,009,569; and other country/region patents FR 2,446,391, FR 2,472093, DE 2,732,192, GB 2,185,786, and USSR 1,268,792) or vertical (see e.g., U.S. Pat. Nos. 2,335,817, 4,074,951, 4,076,448, 4,278,896, 4,350,900, 4,764,683, 5,038,049, 5,083,899, 5,332,354, 6,158,953, 6,191,496, 6,270,308, 6,309,172, and 6,538,340; and other country/region patents DE 2,505,954 and JP 1251), for example.

Wind powered generators of the second category may be divided into several groups based on the driving force of the turbine. In a first group, the drag force between the wind and the turbine blades exerts a driving force on the turbine for causing rotation. Such drag force depends on the velocity difference between the air passing over a blade and the turbine blade itself, as described by the following equation:

$$\gamma = \eta \rho_{air} (\Delta u)^2 / 2,$$

where $\gamma$ is the driving force of the wind turbine, $\eta$ is the friction coefficient between the turbine blades and the air, $\rho_{air}$ is the air density, $\Delta u$ is the velocity difference between the air and the wind turbine blade. Because the friction coefficient is often a very small number, such wind turbines are not as efficient as wind turbines that uses the air lift force as the driving force (e.g., wind impeller shown in FIG. 1).

Such wind turbines using drag force typically have blades that are mostly or entirely exposed or blades installed in or partially covered by a wind conduit or wind tunnel structure with large gaps between the turbine blade ends and the interior walls of the air conduit (see e.g., U.S. Pat. Nos. 1,300,499, 2,335,817, 4,074,951, 4,191,505, 4,278,896, 4,357,130, 4,764,683, 6,191,496, 6,309,172, and 6,538,340; and other country/region patents DE 2,732,192, GB 2,185,786, and USSR 1,268,792).

A second group of the second category strives to use the maximum amount of the wind's kinetic energy. The primary driving force in the second group can be expressed as:

$$\gamma = \Delta p,$$

where $\Delta p$ is the pressure difference between the front and the back of the wind turbine blade. In the second group, the wind turbine blades are installed in a conduit or shaped tunnel. Along the wind flow path through the turbine, the gap between the turbine blade ends and the wind conduit inside wall is minimized, so that the wind flow through such gap is negligible. The wind has to push the turbine blades to rotate the rotor before it flows out of the wind conduit. Examples of such wind powered generators are shown and described in numerous patents (see e.g., U.S. Pat. Nos. 1,935,097, 4,350,900, 5,009,569, 5,083,899, and 5,332,354; and other country/region patents FR 2,446,391 and FR 2,472093).

Theoretically, the driving force in this second group of turbines may be much greater than the lift force in the first category of turbines. When the turbine rotor is at rest, the driving force reaches the maximum (at certain blade positions), i.e., 100% of wind kinetic energy flowing through the wind conduit inlet area. This maximum driving force may be described by the following equation:

$$\gamma = \rho_{air} (u_w)^2 / 2,$$

where $u_w$ is the wind speed.

To manufacture and/or assemble a wind turbine with a minimized gap between the turbine blades and the wind conduit requires high standards of manufacturing quality to control the tolerances needed for minimizing the clearance gap. This leads to a third group of the second category. To avoid the difficulty and/or expense of minimizing the gap, many prior wind turbine designs of the third group are between or a combination of the first and second groups of the second category (see e.g., U.S. Pat. Nos. 4,017,204, 4,076,448, 4,127,356, 5,038,049, 6,158,953, and 6,270,308; and other country/region patents DE 2,505,954 and JP 1251). In the third group, many of the wind turbines also adopt some kind of wind funnel structure with varying (e.g, tapering) gaps. In such funnel structures, the gap between the interior walls of the funnel structure and the turbine blade ends is typically minimized at only one point or along a very short length of the wind flow path. Thus, the driving force on the turbine blades by the wind is a combination of drag force and pressure differential.

The blades of an impeller type of wind turbine (first category) completely face the wind to catch as much wind as possible. For the second category of the wind turbines, however, usually only half of the turbine blades are facing the wind. The blades on another half of such turbine normally rotate against the wind. Thus, the blades moving against the wind are often blocked from the wind (see e.g., U.S. Pat. Nos. 1,300,499, 1,935,097, 2,335,817, 4,017,204, 4,074,951, 4,127,356, 4,278,896, 4,357,130, 4,764,683, 5,009,569, and 6,270,308; and other country/region patents FR 2,446,391, FR 2,472093, DE 2,732,192, GB 2,185,786, and USSR 1,268,792). To improve the efficiency of the second category of wind turbines, many designs have been developed to change the wind flow direction so that more than half of the turbine blades can be pushed by the wind at a given rotational position of the rotor (see e.g., U.S. Pat. Nos. 4,076,448, 4,191,505, 4,350,900, 5,332,354, 6,158, 953, and 6,309,172; and other country/region patents DE 2,505,954 and JP 1251). Very often, such designs involve very complicated structures. Hence, the cost of producing such designs is often too large, as compared to the electricity generated by such wind powered generators, and/or such designs are not feasible for a large scale machine.

Because the kinetic energy in unit cross-section area of a wind stream is very limited, many designs attempt to concentrate the wind energy by using a conduit with venturi shape (see e.g., U.S. Pat. Nos. 1,935,097, 4,017,204, 4,076, 448, 4,127,356, 4,508,973, 4,963,761, 5,009,569, and 6,246, 126; and other country/region patents FR 2,472,093, GB 2,185,786, and USSR 1,268,792). The inlet cross section area (perpendicular to the wind flow direction) of the wind conduit in such designs is usually much greater than the cross section area of the wind turbine at the rotor.

SUMMARY OF THE INVENTION

The problems and needs outlined above may be addressed by embodiments of the present invention. In accordance with one aspect of the present invention, a wind turbine apparatus is provided, which includes a conduit, a rotor, and a splitter. The conduit extends along a generally horizontal longitudinal axis of the apparatus. The conduit includes an inlet portion, an outlet portion, and a middle portion. The inlet portion is located at a first end of the longitudinal axis. The inlet portion has a main inlet opening. The outlet portion is located at a second end of the longitudinal axis. The outlet portion has a main outlet opening. The middle portion is located between the inlet and outlet portions. The inlet portion being fluidly connected to the outlet portion via the middle portion. The rotor is located in the middle portion of the conduit. The rotor includes a shaft and blades. The shaft extends along a rotational axis through the middle conduit portion. The rotor is adapted to rotate about the rotational axis. The longitudinal axis intersects the rotational axis. A rotor angle formed between the longitudinal axis and the rotational axis is between about 45 degrees and about 135 degrees. A longitudinal angle formed between the longitudinal axis and an overall wind flow direction for wind flowing through the conduit when the apparatus is being powered by a wind flow is less than about 45 degrees. The blades extend from the shaft. The blades are located completely within the middle portion of the conduit. The splitter is located in the inlet portion of the conduit, so that the inlet portion of the conduit comprises an upper sub-tunnel and a lower sub-tunnel divided by the splitter. The splitter is generally wedge-shaped with a smaller leading end thereof located closer to the main inlet opening than a larger trailing end thereof. An upper inlet cross-section area for an upper inlet of the upper sub-tunnel is larger than an upper outlet cross-section area for an upper outlet of the upper sub-tunnel. The upper inlet of the upper sub-tunnel is located closer to the main inlet opening of the inlet portion than the upper outlet of the upper sub-tunnel. A lower inlet cross-section area for a lower inlet of the lower sub-tunnel is larger than a lower outlet cross-section area for a lower outlet of the lower sub-tunnel. The lower inlet of the lower sub-tunnel is located closer to the main inlet opening of the inlet portion than the lower outlet of the lower sub-tunnel. The upper and lower outlets of the upper and lower sub-tunnels both feed into a middle portion inlet of the middle portion of the conduit. The middle portion inlet is closer to the main inlet opening than a middle portion outlet of the middle portion along the longitudinal axis. The middle portion outlet is closer to the main outlet opening than the middle portion inlet along the longitudinal axis. An upper interior wall of the middle conduit portion has a substantially circular plane shape that is substantially centered at the rotational axis. An upper clearance gap is located between the blades and the upper interior wall of the middle conduit portion when the blades pass thereby. A lower interior wall of the middle conduit portion has a substantially circular plane shape that is substantially centered at the rotational axis. The lower interior wall of the middle conduit portion is opposite and facing the upper interior wall of the middle conduit portion. A lower clearance gap is located between the blades and the lower interior wall of the middle conduit portion when the blades pass thereby. Side clearance gaps are located between sides of the blades and the middle conduit portion. An outlet centroid of a main outlet cross-section area for the main outlet opening is located higher than an inlet centroid of a main inlet cross-section area for the main inlet opening relative to the rotational axis and relative to the longitudinal axis.

In accordance with another aspect of the present invention, a wind turbine apparatus is provided, which includes a conduit, a rotor, and a splitter. The conduit extends along a longitudinal axis of the apparatus. The conduit includes an inlet portion, an outlet portion, and a middle portion. The inlet portion is located at a first end of the longitudinal axis. The inlet portion has a main inlet opening. The outlet portion is located at a second end of the longitudinal axis. The outlet portion has a main outlet opening. The middle portion is located between the inlet and outlet portions, the inlet portion being fluidly connected to the outlet portion via the middle portion. The rotor is located in the middle portion of the conduit. The rotor includes a shaft and blades (2 or more). The shaft extends along a rotational axis at the middle conduit portion. The rotor is adapted to rotate about the rotational axis. The longitudinal axis intersects the rotational axis. A rotor angle formed between the longitudinal axis and the rotational axis is between about 45 degrees and about 135 degrees. A longitudinal angle formed between the longitudinal axis and an overall wind flow direction for wind flowing through the conduit when the apparatus is being powered by a wind flow is less than about 45 degrees. The blades extend from the shaft. The blades are located completely within the middle portion of the conduit. The splitter is located in the inlet portion of the conduit, so that the inlet portion of the conduit has an upper sub-tunnel and a lower sub-tunnel divided by the splitter. The upper and lower sub-tunnels both feed into a middle portion inlet of the middle portion of the conduit. The middle portion inlet is closer to the main inlet opening than a middle portion outlet of the middle portion along the longitudinal axis, and the middle portion outlet is closer to the main outlet opening than the middle portion inlet along the longitudinal axis. An upper interior wall of the middle conduit portion has a substantially circular plane shape that is substantially centered at the rotational axis. An upper clearance gap is located between the blades and the upper interior wall of the middle conduit portion when the blades pass thereby. A lower interior wall of the middle conduit portion has a substantially circular plane shape that is substantially centered at the rotational axis. The lower interior wall of the middle conduit portion is opposite and facing the upper interior wall of the middle conduit portion. A lower clearance gap is located between the blades and the lower interior wall of the middle conduit portion when the blades pass thereby. Side clearance gaps are located between sides of the blades and the middle conduit portion.

In accordance with yet another aspect of the present invention, a wind turbine apparatus is provided, which includes a conduit, a rotor, and a splitter. The conduit extends along a generally horizontal longitudinal axis of the apparatus. The conduit includes an inlet portion, an outlet portion, and a middle portion. The inlet portion is located at a first end of the longitudinal axis. The inlet portion has a main inlet opening. The outlet portion is located at a second end of the longitudinal axis. The outlet portion has a main outlet opening. The middle portion is located between the inlet and outlet portions. The inlet portion being fluidly connected to the outlet portion via the middle portion. The rotor is located in the middle portion of the conduit. The rotor includes a shaft and blades. The shaft extends along a rotational axis through the middle conduit portion. The rotor is adapted to rotate about the rotational axis. The longitudinal axis intersects the rotational axis. A rotor angle formed between the longitudinal axis and the rotational axis is between about 45 degrees and about 135 degrees. A longitudinal angle formed between the longitudinal axis and an overall wind flow direction for wind flowing through the conduit when the apparatus is being powered by a wind flow is less than about 45 degrees. The blades extend from the shaft. The blades are located completely within the middle portion of the conduit. The splitter is located in the inlet portion of the conduit, so that the inlet portion of the conduit comprises an upper sub-tunnel and a lower sub-tunnel divided by the splitter. The splitter is generally wedge-shaped with a smaller leading end thereof located closer to the main inlet opening than a larger trailing end thereof. An upper inlet cross-section area for an upper inlet of the upper sub-tunnel is larger than an upper outlet cross-section area for an upper outlet of the upper sub-tunnel. The upper inlet of the upper sub-tunnel is located closer to the main inlet opening of the inlet portion than the upper outlet of the upper sub-tunnel. A lower inlet cross-section area for a lower inlet of the lower sub-tunnel is larger than a lower outlet cross-section area for a lower outlet of the lower sub-tunnel. The lower inlet of the lower sub-tunnel is located closer to the main inlet opening of the inlet portion than the lower outlet of the lower sub-tunnel. The upper and lower outlets of the upper and lower sub-tunnels both feed into a middle portion inlet of the middle portion of the conduit. The middle portion inlet is closer to the main inlet opening than a middle portion outlet of the middle portion along the longitudinal axis. The middle portion outlet is closer to the main outlet opening than the middle portion inlet along the longitudinal axis. An upper interior wall of the middle conduit portion has a substantially circular plane shape that is substantially centered at the rotational axis. An upper clearance gap is located between the blades and the upper interior wall of the middle conduit portion when the blades pass thereby. A lower interior wall of the middle conduit portion has a substantially circular plane shape that is substantially centered at the rotational axis. The lower interior wall of the middle conduit portion is opposite and facing the upper interior wall of the middle conduit portion. A lower clearance gap is located between the blades and the lower interior wall of the middle conduit portion when the blades pass thereby. Side clearance gaps are located between sides of the blades and the middle conduit portion. An outlet centroid of a main outlet cross-section area for the main outlet opening is located higher than an inlet centroid of a main inlet cross-section area for the main inlet opening relative to the rotational axis and relative to the longitudinal axis. A first electric power generator is located outside of a first side of the conduit and is rotationally coupled to a first end of the shaft. A first generator rotor of the first electric power generator is adapted to rotate about the rotational axis. A second electric power generator is located outside of a second side of the conduit and is rotationally coupled to a second end of the shaft. A second generator rotor of the second electric power generator is adapted to rotate about the rotational axis.

In accordance with yet another aspect of the present invention, a wind turbine apparatus is provided, which includes a conduit, a rotor, a first electric power generator, and a second electric power generator. The conduit extends along a longitudinal axis of the apparatus. The conduit includes an inlet portion, an outlet portion, and a middle portion. The inlet portion is at a first end of the longitudinal axis. The inlet portion has a main inlet opening. The outlet portion is at a second end of the longitudinal axis. The outlet portion has a main outlet opening. The middle portion is located between the inlet and outlet portions. The inlet portion is fluidly connected to the outlet portion via the middle portion. The rotor is located in the middle portion of the conduit. The rotor includes a shaft extending along a rotational axis at the middle conduit portion. The rotor is adapted to rotate about the rotational axis. The longitudinal axis intersects the rotational axis. A rotor angle formed between the longitudinal axis and the rotational axis is between about 45 degrees and about 135 degrees. A longitudinal angle formed between the longitudinal axis and an overall wind flow direction for wind flowing through the conduit when the apparatus is being powered by a wind flow is less than about 45 degrees. Blades extend from the shaft. The blades are located completely within the middle portion of the conduit. An upper interior wall of the middle conduit portion has a substantially circular plane shape that is substantially centered at the rotational axis. An upper clearance gap is located between the blades and the upper interior wall of the middle conduit portion when the blades pass thereby. A lower interior wall of the middle conduit portion has a substantially circular plane shape that is substantially centered at the rotational axis. The lower interior wall of the middle conduit portion is opposite of and faces the upper interior wall of the middle conduit portion. A lower clearance gap is located between the blades and the lower interior wall of the middle conduit portion when the blades pass thereby. The first electric power generator is located outside of a first side of the conduit and is rotationally coupled to a first end of the shaft. A first generator rotor of the first electric power generator is adapted to rotate about the rotational axis. The second electric power generator is located outside of a second side of the conduit and is rotationally coupled to a second end of the shaft. A second generator rotor of the second electric power generator is adapted to rotate about the rotational axis.

In accordance with still another aspect of the present invention, a wind turbine apparatus is provided, which includes a conduit and a rotor. The conduit extends along a longitudinal axis of the apparatus. The conduit includes an inlet portion, an outlet portion, and a middle portion. The inlet portion is at a first end of the longitudinal axis. The inlet portion has a main inlet opening. The outlet portion is at a second end of the longitudinal axis. The outlet portion has a main outlet opening. The middle portion is located between the inlet and outlet portions. The inlet portion is fluidly connected to the outlet portion via the middle portion. The rotor is located in the middle portion of the conduit. The rotor includes a shaft extending along a rotational axis at the middle conduit portion. The rotor is adapted to rotate about the rotational axis. The longitudinal axis intersects the rotational axis. A rotor angle formed between the longitudinal axis and the rotational axis is between about 45 degrees and about 135 degrees. A longitudinal angle formed between the longitudinal axis and an overall wind flow direction for wind flowing through the conduit when the apparatus is being powered by a wind flow is less than about 45 degrees. Blades extend from the shaft. The blades are located completely within the middle portion of the conduit. An upper interior wall of the middle conduit portion has a substantially circular plane shape that is substantially centered at the rotational axis. An upper clearance gap is located between the blades and the upper interior wall of the middle conduit portion when the blades pass thereby. The upper clearance gap is less than about 10 mm. A lower interior wall of the middle conduit portion has a substantially circular plane shape that is substantially centered at the rotational axis. The lower interior wall of the middle conduit portion is opposite of and faces the upper interior wall of the middle conduit portion. A lower clearance gap is located between the blades and the lower interior wall of the middle conduit portion when the blades pass thereby. The lower clearance gap is less than about 10 mm. Side clearance gaps of less than about 10 mm are located between sides of the blades and the middle conduit portion. In other embodiments (e.g., having a rotor diameter larger than 10 meters), these clearance gaps may be larger than 10 mm. But preferably, the upper clearance gap, the lower clearance gap, and the side clearance gaps are minimized and made as small as possible so that only negligible amounts of wind pass through such clearance gaps relative to the amount of wind passing through the turbine.

The foregoing has outlined rather broadly features of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The following is a brief description of the drawings, which illustrate exemplary embodiments of the present invention and in which.

DETAILED DESCRIPTION OF ILLUSTRATIVE EMBODIMENTS

Figure 1:
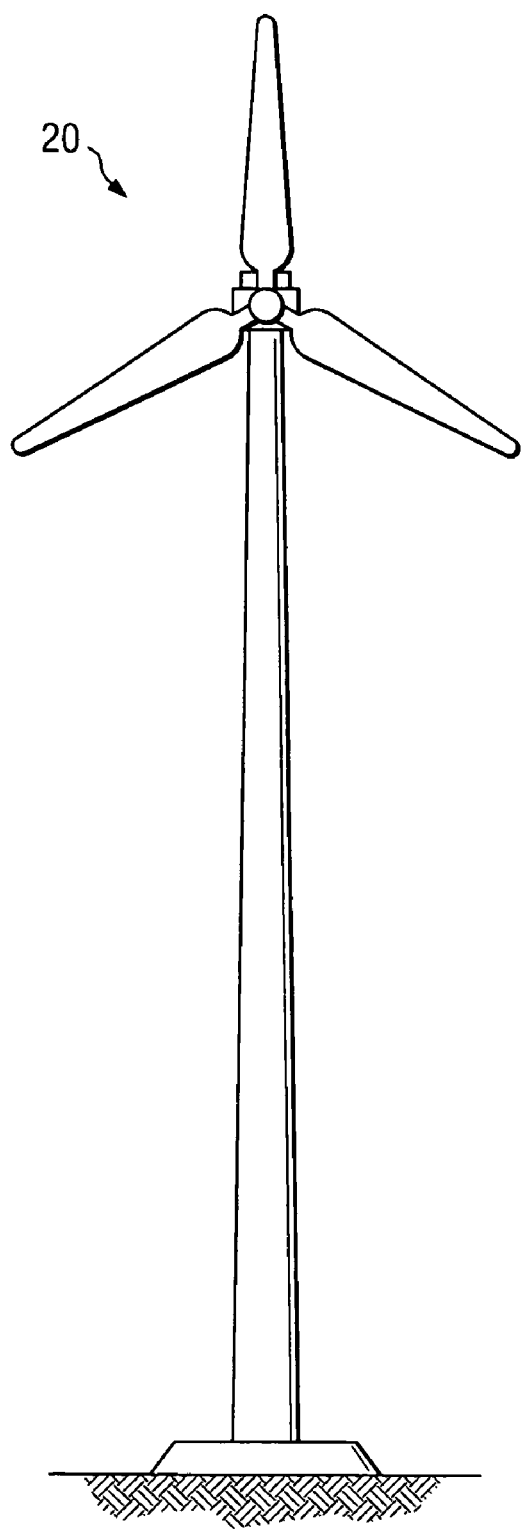
FIG. 1 shows a typical wind impeller of the prior art.

Referring now to the drawings, wherein like reference numbers are used herein to designate like or similar elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

Figure 2:
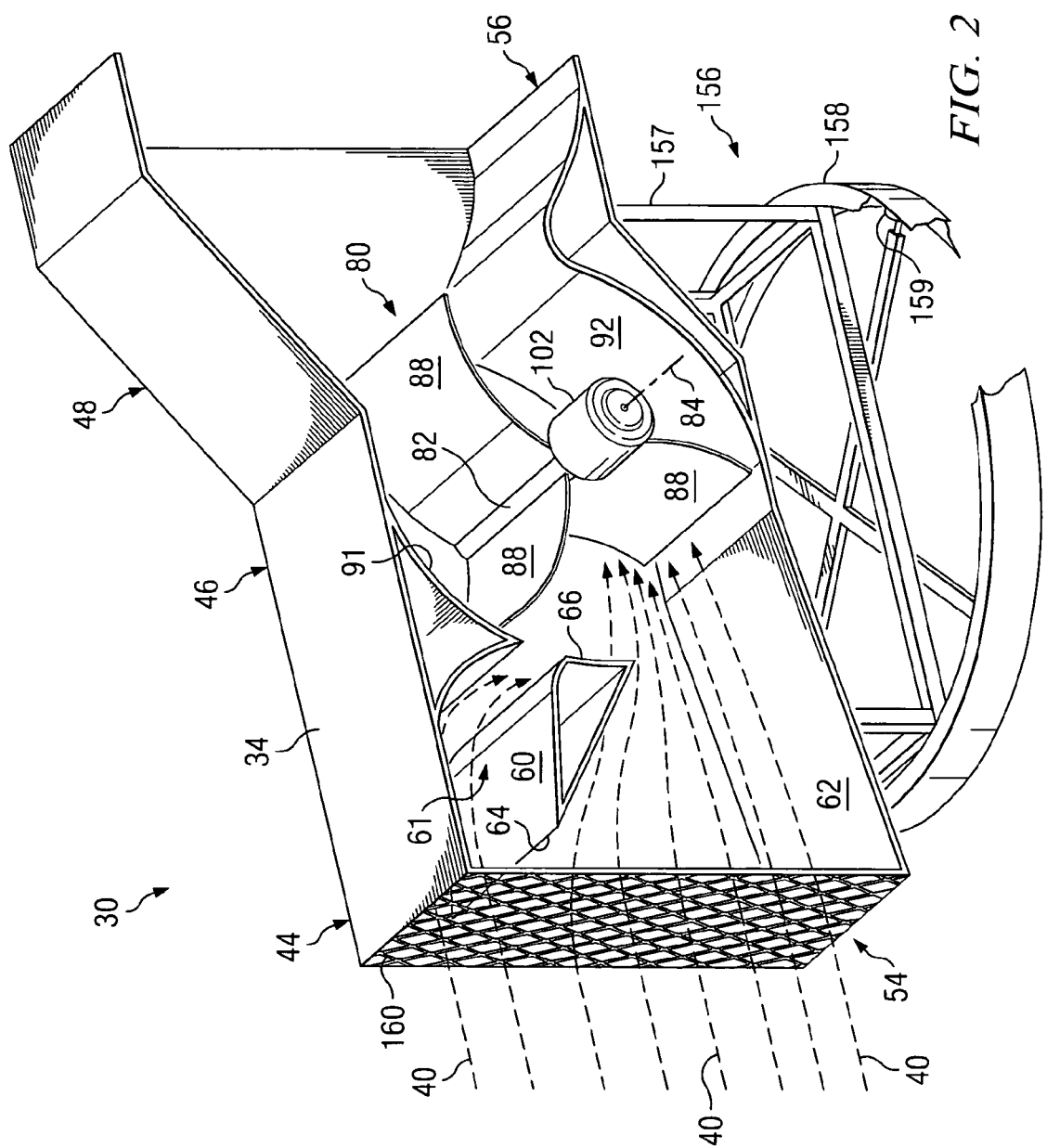
FIG. 2 is a perspective view showing a first embodiment of the present invention.
Figure 3:
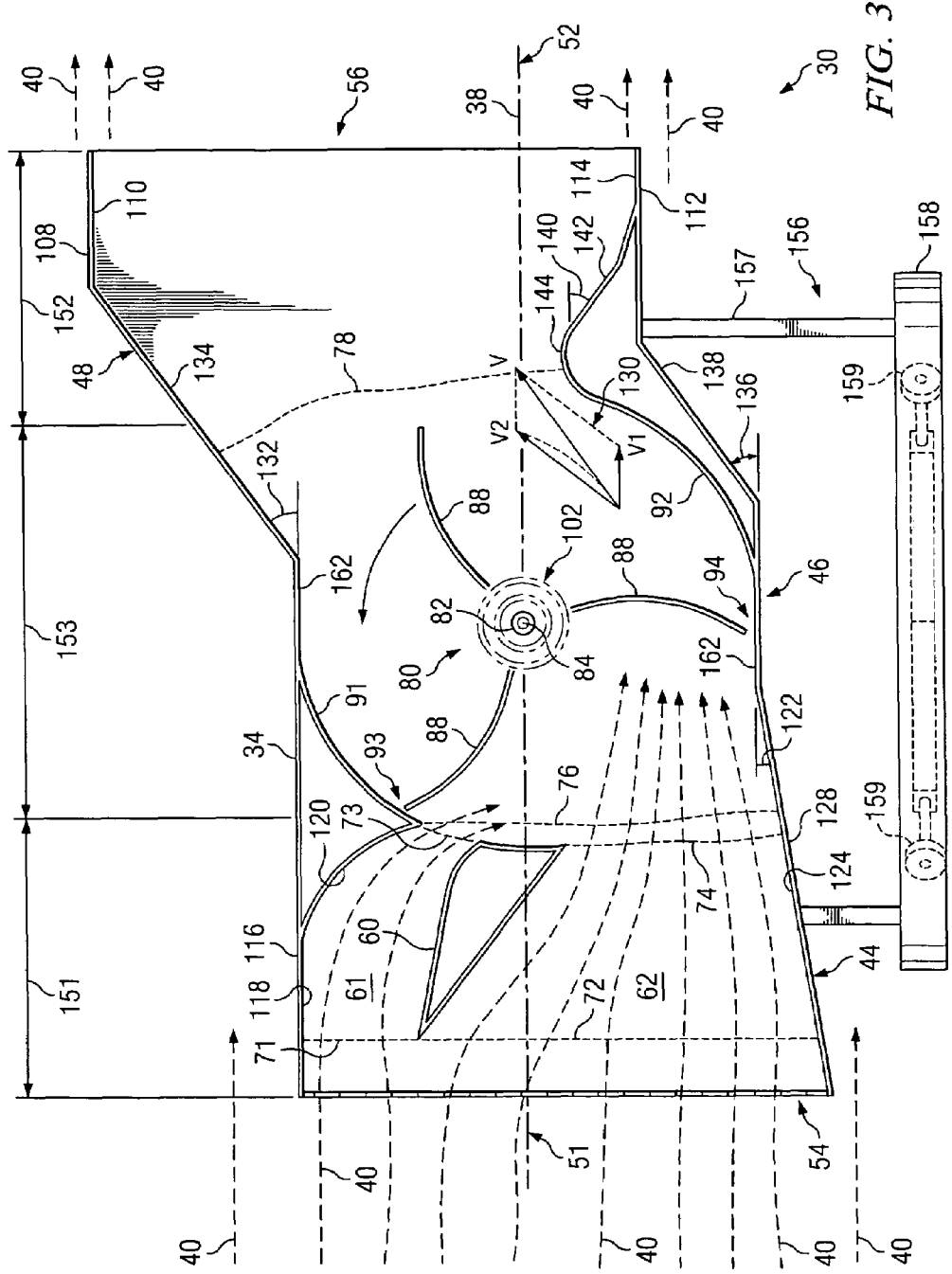
FIG. 3 is side view showing the first embodiment of the present invention.
Figure 5A:
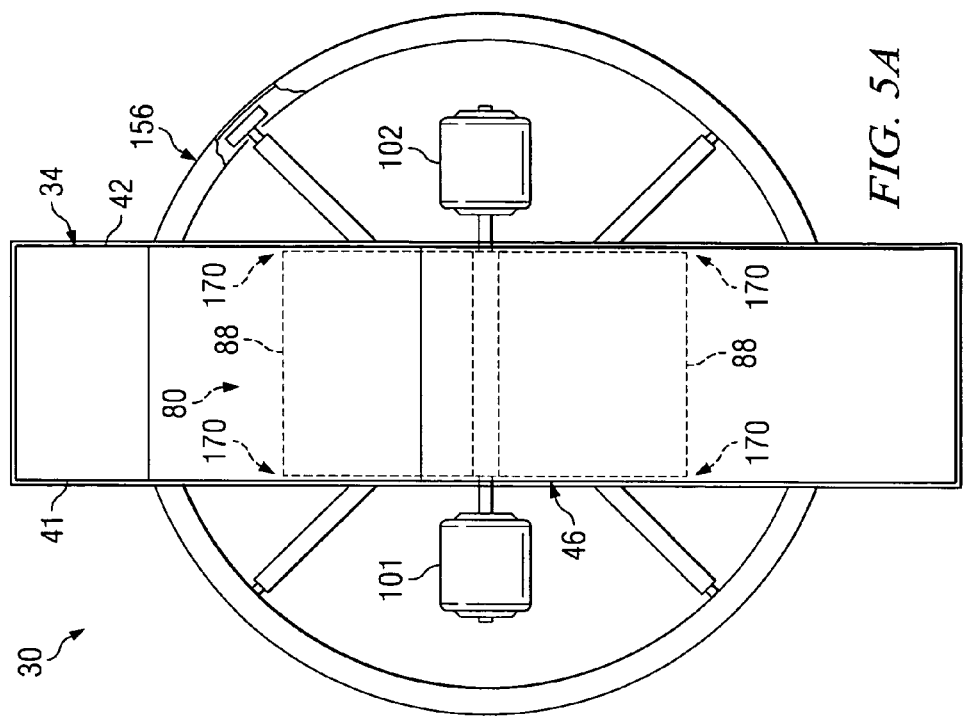
FIG. 5A is a top view showing the first embodiment of the present invention illustrating the side clearance gaps.
Figure 4:
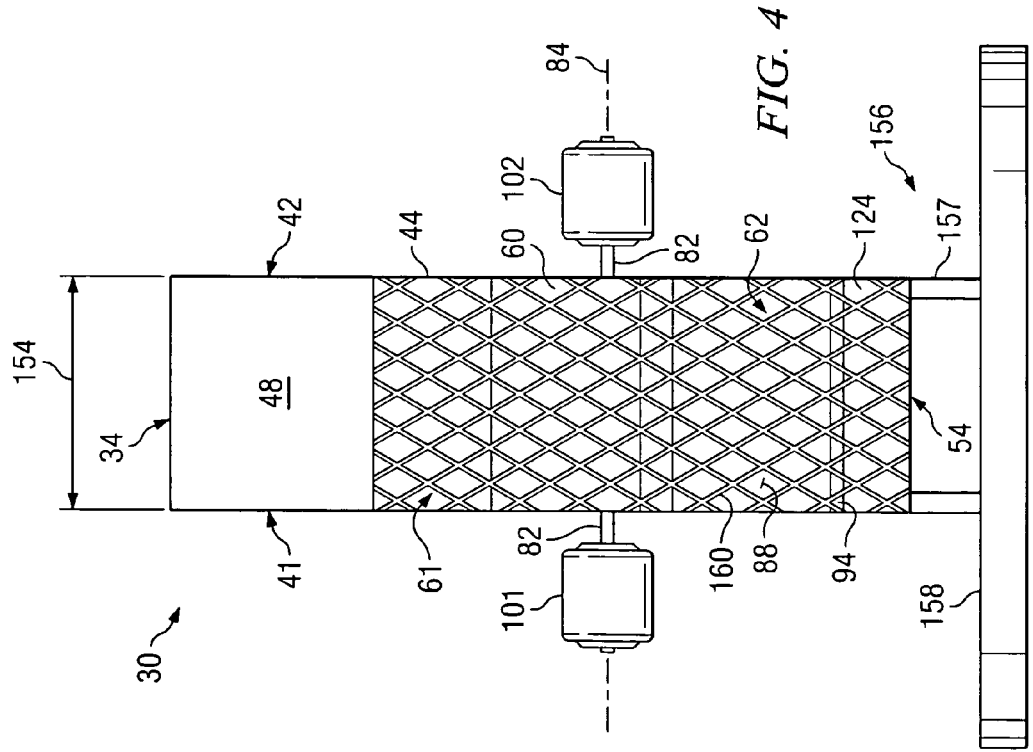
FIG. 4 is a front view showing the first embodiment of the present invention.
Figure 5B:
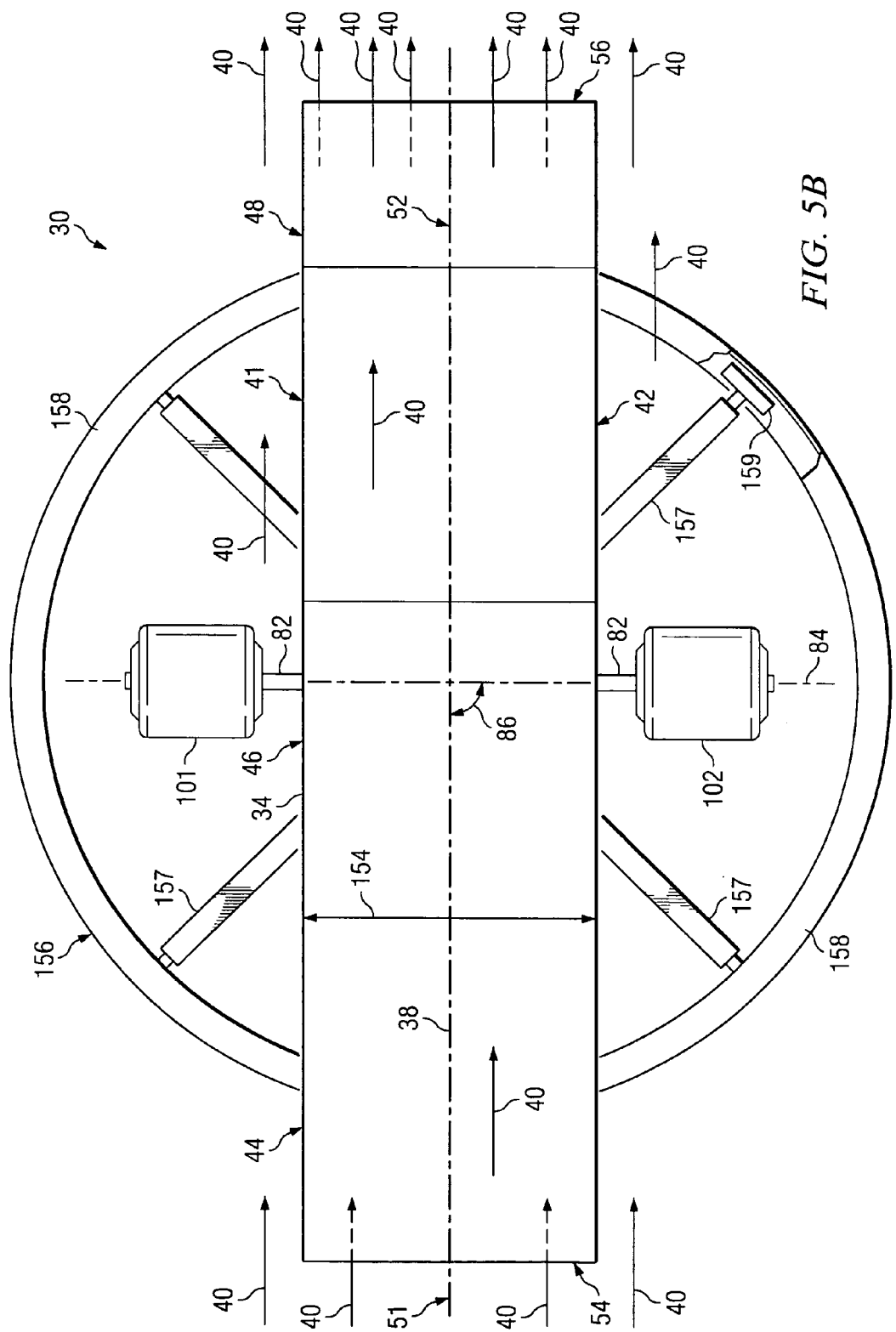
FIG. 5B is a top view showing the first embodiment of the present invention.

Generally, an embodiment of the present invention provides a wind powered turbine. The illustrative wind powered turbines shown herein are adapted for use in generating electricity, for example, by having generators coupled thereto. However, an embodiment of the present invention may have other uses, as will be apparent to one of ordinary skill in the art having the benefit of this disclosure. FIGS. 2-5B show various views of a wind powered turbine 30 in accordance with a first embodiment of the present invention. FIG. 2 is a perspective view of the turbine 30. FIG. 3 is a side view of the turbine 30. FIG. 4 is a front view of the turbine 30. And, FIGS. 5A and 5B are top views of the turbine 30.

The turbine 30 has a conduit 34 that extends along a generally horizontal longitudinal axis 38 of the turbine 30. This arbitrarily assigned longitudinal axis 38 is shown in FIG. 3, and it is provided as a reference point for describing various aspects of the first embodiment. In this example, the longitudinal axis 38 is oriented horizontally and generally along the direction of the wind flow through the conduit 34 when the turbine is being powered by the wind flow. From the perspective of a top view, as shown in FIG. 5B, a longitudinal angle formed between the longitudinal axis 38 and the overall wind flow direction (see e.g., wind flow arrows 40 in FIG. 5B) for wind flowing through the conduit 34 when the turbine 30 is being powered by the wind flow 40 is preferably less than about 45 degrees. In the example shown in FIG. 5B, the longitudinal angle is about zero degrees, for example. In FIGS. 2 and 3, a side panel of the conduit 34 is removed for purposes of illustration. Preferably, the sides 41, 42 of the conduit 34 both have a flat planar shape (see e.g., FIGS. 4 and 5B), as discussed further below. An example wind flow 40 is also shown in FIGS. 2 and 3 for purposes of illustrating fluid dynamics through the turbine 30 in a simplified manner. As will be apparent to one of ordinary skill in the art, other wind flow patterns also will be experienced in an actual application.

The conduit 34 has an inlet portion 44, a middle portion 46, and an outlet portion 48. The inlet conduit portion 44 is located at a first end 51 of the longitudinal axis 38 and has a main inlet opening 54 at the front of the wind turbine 30 (i.e., first end 51 of longitudinal axis 38 is at front of turbine 30). Conversely, the outlet conduit portion 48 is located at a second end 52 of the longitudinal axis 38 and has a main outlet opening 56 at the back of the turbine 30. The inlet portion 44 is fluidly connected to the outlet portion 48 via the middle portion 46. Hence, wind passing through the conduit 34 of the turbine 30 enters the main inlet opening 54, flows through the inlet portion 44 to the middle portion 46, flows through the middle portion 46 to the outlet portion 48, flows through the outlet portion 48, and exits the conduit 34 through the main outlet opening 56. In other embodiments, however, there may be other secondary or auxiliary inlets and/or outlet openings for the turbine 30 (not shown).

Referring to FIGS. 2 and 3, a splitter 60 is located in the inlet portion 44 of the conduit 34. Preferably, the splitter 60 extends from one side 41 to the other side 42 (laterally) within the inlet portion 44. The inlet portion 44 thus has an upper sub-tunnel 61 and a lower sub-tunnel 62 divided by the splitter 60. Preferably, the splitter 60 is generally wedge-shaped with a smaller leading end 64 thereof located closer to the main inlet opening 54 than a larger trailing end 66 thereof. The upper sub-tunnel 61 has an upper inlet 71 with an upper inlet cross-section area (i.e., perpendicular to the longitudinal axis 38) located closer to the main inlet opening 54 than an upper outlet 73 (having an upper outlet cross-section area) of the upper sub-tunnel 61. Likewise, the lower sub-tunnel 62 has a lower inlet 72 with a lower inlet cross-section area (i.e., perpendicular to the longitudinal axis 38) located closer to the main inlet opening 54 than a lower outlet 74 (having a lower outlet cross-section area) of the lower sub-tunnel 62. Preferably, the upper inlet cross-section area is larger than the upper outlet cross-section area, and the lower inlet cross-section area is larger than the lower outlet cross-section area, as shown in FIGS. 2 and 3 for example. In other embodiments, however, the splitter 60 may have another shape and size, and the size of the sub-tunnel inlets 71, 72 relative the sub-tunnel outlets 73, 74 may be varied. In the first embodiment, the upper and lower sub-tunnel inlets 71, 72 are not at the same location along the longitudinal axis 38 as the main inlet opening 54. But in other embodiments (not shown), the leading end 64 of the splitter 60 may extend to main inlet opening 54 or outside of the inlet portion 44. Similarly, the trailing end 66 of the splitter 60 may not extend to the middle conduit portion 46 in other embodiments (not shown). In any case, the upper and lower sub-tunnels 61, 62 both feed into a middle portion inlet 76 of the middle conduit portion 46. The middle portion inlet 76 is closer to the main inlet opening 54 than is a middle portion outlet 78 of the middle conduit portion 46 along the longitudinal axis 38. Likewise, the middle portion outlet 78 is closer to the main outlet opening 56 than is the middle portion inlet 76 along the longitudinal axis 38.

A rotor 80 is located in the middle portion 46 of the conduit 34. A shaft 82 of the rotor 80 extends along a rotational axis 84 through the middle conduit portion 46. The rotor 80 is adapted to rotate about the rotational axis 84 during operation of the turbine 30. Hence, the shaft 82 is preferably supported by some type of bearings (e.g., roller, hydraulic) (not shown), and preferably at two ends of the shaft 82. The longitudinal axis 38 intersects with the rotational axis 84 (see FIGS. 3 and 5B). From the perspective of a top view, as shown in FIG. 5B, a rotor angle 86 formed between the longitudinal axis 38 and the rotational axis 84 is preferably between about 45 degrees and about 135 degrees. In the example shown in FIG. 5B, the rotor angle 86 is about 90 degrees, for example.

Blades 88 extend from the shaft 82. The blades 88 are located completely within the middle portion 46 of the conduit 34. There may be any number of blades 88 (e.g., 2, 3, 4, 5, 6, 7, 8, etc.). Currently, the preferred number of blades 88 is three, as shown in the first embodiment (see e.g., FIGS. 2 and 3). The rational for preferring three blades 88 and for using other possible blade configurations is discussed further below. The shape of the blades 88 may vary for different embodiments. For example, the blades 88 may be flat plate-shaped, multi-chord flat plates, curved, or combinations thereof. The shape of the blades 88 chosen may be dictated by the size of the blades 88 and the materials used to make the blades 88. The blades 88 may be made from any of a variety of suitable materials, including (but not limited to): metal, aluminum, titanium, steel, carbon-fiber composite, fiber-glass composite, nylon composite, wood, plastic, compounds thereof, alloys thereof, composites thereof, or combinations thereof, for example.

In a preferred embodiment, the upper inlet cross-section area of the upper sub-tunnel 61 is much smaller than the lower inlet cross-section area of the lower sub-tunnel 62 so that a majority of the wind flow 40 passes through the lower sub-tunnel 62. Based on experimental results, the optimum range has been found to be where the upper inlet cross-section area is between about 19% and about 35% of the lower inlet cross-section area. In a more preferred embodiment, the upper inlet cross-section area is between about 22% and about 29% of the lower inlet cross-section area. In other embodiments, the range may be greater and the practical or optimum range limits may depend upon the rotor diameter used. If the rotor diameter is larger, the optimum range may be lower (e.g., from about 13% to about 18%), for example. This optimum range may vary depending on the rotor inertia and the expected wind velocities for a given turbine's usage location. For a smaller rotor diameter, the lower optimum range limit may be about 20%, as another example. Another factor that affects this optimum range is the cross-sectional area size of the main inlet opening 54.

In the inlet conduit portion 44, it is preferred to have a smaller lower outlet cross-section area than the lower inlet cross-section area for the lower sub-tunnel 62 (see e.g., FIG. 3). This allows the air moving toward the blades 88 in the lower sub-tunnel 62 to be compressed as it enters the middle conduit portion 46, which increases the pressure at the blade 88. By energy conservation, the lost velocity of the wind flow 40 when it hits the blades 88 in the middle conduit portion 46 is converted to pressure against the blades 88. By maximizing the pressure at the blade 88 and minimizing the outlet pressure (at the outlet conduit portion 48), the pressure differential across the blade 88 may be maximized, which yields more power and greater turbine efficiency.

Referring to FIGS. 2 and 3, an upper interior wall 91 and a lower interior wall 92 of the middle conduit portion 46 each has a substantially circular plane shape. Preferably, this circular plane shape for the upper and lower interior walls 91, 92 of the middle conduit portion 46 is substantially centered at the rotational axis 84 so that a clearance gap 93, 94 between the upper and lower interior walls 91, 92 and the blades 88 passing thereby may be minimized. Hence, an upper clearance gap 93 is located between the blades 88 and the upper interior wall 91 of the middle conduit portion 46 when the blades 88 pass thereby. Likewise, a lower clearance gap 94 is located between the blades 88 and the lower interior wall 92 of the middle conduit portion 46 when the blades 88 pass thereby. It is preferred to minimize the upper and lower clearance gaps 93, 94 to maximize the pressure exerted on the blades 88 as the wind flows into the middle conduit portion 46 because a turbine 30 for an embodiment of the present invention is preferably powered primarily by the conversion of wind velocity to pressure on the blades 88 (e.g., as compared to drag force across the blades).

Referring to FIG. 5A, which is a top view of the first embodiment, the rotor 80 is shown in phantom lines. As illustrated in FIG. 5A, there are side clearance gaps 170 located between the sides of the blades 88 and the sides 41, 42 of the conduit 34. It is preferred to minimize these side clearance gaps 170 to maximize the pressure exerted on the blades 88 as the wind flows through the middle conduit portion 46, again, because a turbine 30 for an embodiment of the present invention is preferably powered primarily by the conversion of wind velocity to pressure on the blades 88.

In relatively smaller embodiments (e.g., having a rotor diameter less than about 10 meters), the upper and lower clearance gaps 93, 94 are less than about 10 mm, and the side clearance gaps 170 are less than about 10 mm. In practice, the size of the upper and lower clearance gaps 93, 94 and the side clearance gaps 170 will typically be a function of the rotor diameter, among other factors. As the rotor diameter increases, the size of the upper and lower clearance gaps 93, 94 and/or the side clearance gaps 170 will often need to be increased. The practical size limitations on the clearance gaps 93, 94, 170 typically will be dependent upon several factors, including (but not necessarily limited to): manufacturing accuracy, flexibility of materials used, thermal expansion/contraction of materials used, for example. Conversely, as the rotor diameter decreases, the size of the upper and lower clearance gaps 93, 94 and/or the side clearance gaps 170 may be decreased. The size of the upper clearance gap 93, the lower clearance gap 94, and the side clearance gaps 170 will often be about the same in a preferred embodiment. For example, if the rotor 80 has a diameter of less than about 3 meters, the upper clearance gap 93, the lower clearance gap 94, and the side clearance gaps 170, each may be less than about 5 mm. As another example, if the rotor 80 has a diameter of less than about 2 meters, the upper clearance gap 93, the lower clearance gap 94, and the side clearance gaps 170, each may be less than about 3 mm. Thus in a preferred embodiment, the amount of wind flow 40 that can pass through the clearance gaps 93, 94, 170 is negligible (as compared to the wind flowing through the turbine 30). The clearance gaps 93, 94, 170 may be made even smaller, but at some point it may not be cost effective to provide higher manufacturing tolerances for the turbines 30.

Still referring to FIGS. 2–5B, the first embodiment illustrates an application of the wind powered turbine 30 for use in generating electricity. In the first embodiment, two electricity generators 101, 102 are coupled to the rotor shaft 82. In FIG. 3, one of the generators 102 is shown in phantom lines for purposes of illustrating the preferred placement of the generator 102 in relation to the rotor shaft 82. As is the preferred configuration, each generator 101, 102 is rotationally coupled to each end of the rotor shaft 82. More specifically, a first electric power generator 101 is located outside of a first side 41 of the conduit 34 and is rotationally coupled to a first end of the rotor shaft 82. Thus, a first generator rotor (not shown) in the first electric power generator 101 is adapted to rotate about the rotational axis 84 as it is driven by the rotor shaft 82. Likewise, a second electric power generator 102 is located outside of a second side 42 of the conduit 34 and is rotationally coupled to a second end of the rotor shaft 82. Hence, a second generator rotor (not shown) in the second electric power generator 102 is adapted to rotate about the rotational axis 84 as it is driven by the rotor shaft 82. The first and second generators 101, 102 are preferably the same size (e.g., same weight, same size dimensionally, and same wattage output) to provide a balanced torque load on the rotor shaft 82 and to provide a balanced structure, mechanically. An advantage of having two generators 101, 102 symmetrically located on each end of the rotor shaft 82 is that the maximum stress exerted on the shaft 82 may be cut in half while still producing the same about of power as one larger generator (of double the power output) attached to only one end of the shaft 82. By reducing the stress on the shaft, the available choices of materials is broadened and the amount of material for the shaft 82 (i.e., cost and/or weight of the shaft 82) needed structurally may be reduced. The supports and bracket for supporting the generators 101, 102 are not shown for purposes of simplifying the illustrations. Such supports and brackets required to adequately support the generators 101, 102 and alternative structures thereof should be apparent to one of ordinary skill in the art. In other embodiments, there may be fewer or greater numbers of generators and such generators may be mounted and connected differently than that shown in the first embodiment.

Referring again to the conduit 34 of the first embodiment shown in FIGS. 2–5B, the main inlet opening 54 has a main inlet cross-section area (perpendicular to the longitudinal axis 38) with an inlet centroid (i.e., centroid of the main inlet cross-section area). Likewise, the main outlet opening 56 has a main outlet cross-section area (perpendicular to the longitudinal axis 38) with an outlet centroid. In a preferred embodiment, the area size of the main inlet cross-section area is about equal to that of the main outlet cross-section area. It is also preferred to have the outlet centroid located higher than the inlet centroid relative to the rotational axis 84 and relative to the longitudinal axis 38, as shown in FIG. 3 for example. This configuration of having the outlet centroid higher than the inlet centroid is preferred to allow the air to flow out of the middle conduit portion 46 easier and to hinder or prevent turbulent vortex patterns in the outlet conduit portion 48, as discussed in more detail below. Also, it is contemplated that the conduit 34 may be rotated 90 degrees or flipped 180 degrees about the longitudinal axis 38 to provide a substantially equivalent device.

It is preferred to have an outer top surface section 108 of the outlet conduit portion 48 that is substantially parallel to the longitudinal axis 38, has a substantially flat planar shape, and is proximate to the main outlet opening 56, as shown in FIGS. 2 and 3. In such preferred configuration, the outer top surface section 108 may provide a wind flow 40 coming across the top of the turbine 30 at the main outlet opening 56 that is substantially parallel with the longitudinal axis 38 and preferably laminar flow. Also in such case, it is preferred to have an inner top surface section 110 proximate to the main outlet opening 56 that is substantially parallel with the longitudinal axis 38. This will provide a matched or similar air flow direction for the wind flow 40 passing over the turbine 30 at the main outlet opening 56 and the air exiting the conduit 34 at the top of the main outlet opening 54. If the wind flow 40 passing over the top of the turbine 30 has a greater velocity (i.e., more energy) than the air flowing out of the main outlet opening 56, it may create a venturi effect providing a lower pressure at the main outlet opening 56 just inside the outlet conduit portion 48 and helping pull the air out of the conduit 34 (like a vacuum pump). A lowered pressure at the main outlet opening 56 yields a high differential pressure across the blade 88 located at lower interior wall 92 of the middle conduit portion 46, which in turn increases the force exerted on the blade 88 (i.e., more power generated).

In the first embodiment shown in FIGS. 2–5B, the conduit 34 is constructed from sheet metal, for example. Thus, in such case, some of the interior surfaces may be the same shape and contour as an exterior surface. The use of sheet metal has numerous advantages, including ease of manufacturing, relatively low in cost to manufacture, flexibility of shapes, scalability, and durability, for example. In other embodiments (not shown), however, the conduit 34 may be formed using other materials and fabrication methods. The conduit 34 may be made from any of a wide variety of suitable, currently known or future developed, structural materials, including (but not limited to): metal, wood, glass, acrylic, plastic, PVC, fiberglass composite, carbon fiber composite, nylon composite, composites thereof, and combinations thereof, for example.

It is also preferred to have an outer bottom surface section 112 of the outlet conduit portion 48 that is substantially parallel to the longitudinal axis 38, has a substantially flat planar shape, and is proximate to the main outlet opening 56, as shown in FIGS. 2 and 3. In such preferred configuration, the outer bottom surface section 112 may provide a wind flow 40 corning across the bottom of the turbine 30 at the main outlet opening 56 that is substantially parallel with the longitudinal axis 38 and preferably laminar flow. Also in such case, it is preferred to have an inner bottom surface section 114 proximate to the main outlet opening 56 that is substantially parallel with the longitudinal axis 38. This will provide a matched or similar air flow direction for the wind flow 40 passing under the turbine 30 at the main outlet opening 56 and the air exiting the conduit 34 at the bottom of the main outlet opening 56 (see e.g., FIG. 3). If the wind flow 40 passing under the bottom of the turbine 30 has a greater velocity (i.e., more energy) than the air flowing out of the main outlet opening 56, it may also create a venturi effect providing a lower pressure at the main outlet opening 56 just inside the outlet conduit portion 48 helping pull the air out of the conduit 34 (like a vacuum pump). Again, a lowered pressure at the main outlet opening 56 yields a high differential pressure across the blade 88 located at lower interior wall 92 of the middle conduit portion 46, which in turn increases the force exerted on the blade 88 (i.e., more power generated).

As mentioned above, it is preferred that the outer surfaces for the sides 41, 42 of the conduit 34 are substantially flat and planar shaped and substantially parallel with the longitudinal axis 38 (see e.g., FIGS. 4 and 5B). In doing so, the wind flow 40 over the sides 41, 42 of the conduit 34 (outside of the conduit 34) may be laminar and mostly unobstructed (e.g., except for the generators 101, 102 and their associated support members (not shown)) (see e.g., FIG. 5B). In such case, the wind flow 40 across the sides 41, 42 of the conduit 34 at the main outlet opening 56 may retain most of its velocity. If the wind flow 40 passing across the sides 41, 42 of the conduit 34 has a greater velocity (i.e., more energy) than the air flowing out of the main outlet opening 56, it may create or further contribute to a venturi effect, and thus provide a lower pressure at the main outlet opening 56 just inside the outlet conduit portion 48 and helping pull the air out of the conduit 34. Thus, the wind flow 40 outside of the conduit 34 is taken into consideration in the design and configuration of the first embodiment. One of the goals is to provide a wind flow 40 that is flowing in the same or generally the same air flow direction as air exiting the turbine 30 while striving to maximize the velocity retention of the wind flow 40 over the outside of the conduit 34, which may provide greater power output and greater efficiency from the turbine 30. Many of the interior walls and exterior surfaces of the conduit of the first embodiment were chosen and designed with this goal in mind.

Preferably, an outer top surface section 116 of the inlet conduit portion 44 is substantially parallel with the longitudinal axis 38, has a substantially flat planar shape, and is proximate to the main inlet opening 54 (see e.g., FIGS. 2, 3, and 5B). Because the first embodiment is made from sheet metal, for example, there may also be a corresponding inner top surface section 118 in the inlet conduit portion 44 that is also substantially parallel with the longitudinal axis 38, has a substantially flat planar shape, and is proximate to the main inlet opening 54 (see e.g., FIG. 3). In the first embodiment, an upper sub-tunnel top surface section 120 is provided to affect the shape of the upper sub-tunnel 61, as shown in FIG. 3. In the first embodiment the upper sub-tunnel top surface section 120 may be formed from a same sheet as the upper interior wall 91 of the middle conduit portion 46, for example. In other embodiments (not shown), the upper sub-tunnel top surface section 120 may be made from a separate piece than that of the upper interior wall 91 of middle conduit portion 46.

Also preferably, an acute inner bottom surface inlet angle 122 is formed between an inner bottom surface section 124 of the inlet conduit portion 44 and the longitudinal axis 38 (see e.g., FIG. 3). The inner bottom surface section 124 is preferably flat planar shaped and proximate to the main inlet opening 54. This acute inner bottom surface inlet angle 122 may provide several features, such as allowing rain water that enters the inlet conduit portion 44 to drain out of the conduit 34. Also, this angle 122 (along with the shape of the splitter 60 and/or the shape of the upper sub-tunnel top surface section 120) may contribute to providing a smaller middle portion inlet 76 than the main inlet opening 54 so that the velocity of wind flow 40 entering the main inlet opening 54 may be increased before it enters the middle portion 46 where it encounters one or more of the blades 88. Generally, a higher wind velocity at the blades 88 will yield greater pressure against the blade 88 (i.e., more power). In the first embodiment (see e.g., FIG. 3), the outer bottom surface section 128 of the inlet conduit portion 44 is also slanted at the inner bottom surface inlet angle 122 relative to the longitudinal axis 38. In other embodiments (not shown), however, the outer bottom surface section 122 of the inlet conduit portion 44 may be slanted at a different angle than that of the inner bottom surface section 124 of the inlet conduit portion 44 (e.g., by being formed from separate pieces or from different sections of a folded portion). For example, in other embodiments (not shown), the outer bottom surface section 128 of the inlet conduit portion 44 may be substantially parallel with the longitudinal axis 38.

When the wind flows into the conduit 34 (through the main inlet opening 54), it will typically be along a horizontal direction, generally. And when the wind flows out of the middle conduit portion 46, the direction of the wind flow will be changed (i.e., tilted upward) by the spinning rotor 80. For this reason, it is preferable to have the outlet conduit portion 48 tilted upward accordingly to increase the efficiency of the wind flowing out of the middle conduit portion 46. In FIG. 3, a wind velocity vector diagram 130 is shown at about the arc center of the lower interior wall 92 of the middle conduit portion 46. In this wind velocity diagram 130, $V_1$ represents the wind velocity coming into the middle conduit portion 46, $V_2$ represents the rotor velocity at that point, and V represents the combined velocity of $V_1$ and $V_2$. Preferably, an inner top surface outlet angle 132 formed between an inner top surface section 134 of the outlet conduit portion 48 (proximate to the middle portion outlet) and the longitudinal axis 38 is substantially parallel to the combined velocity vector V (at about the arc center of the lower interior wall 92 of the middle conduit portion 46), as shown in FIG. 3. Having the inner top surface section 134 of the outlet conduit portion 48 proximate to the middle portion outlet 78 at this angle 132 may aid in getting the wind flow out of the middle conduit portion 46 more efficiently, which is an advantage of this configuration. Through experimentation, it has been found that optimum range for the inner top surface outlet angle 132 (or for the outlet conduit portion to be tilted up in general) is between about 26 degrees and about 39 degrees. The optimum angle will depend on the rotor diameter for a given application. In other embodiments (not shown), however, the inner top surface section 134 of the outlet conduit portion 48 proximate to the middle portion outlet 78 may be configured at other angles, including being parallel to the longitudinal axis 38.

Still referring to FIG. 3, an outer bottom surface transition angle 136 formed between an outer bottom surface 138 (where the middle and outlet conduit portions 46, 48 meet along the bottom of the conduit 34) and the longitudinal axis 38 is preferably about the same as the inner top surface outlet angle 132. But in other embodiments (not shown), the outer bottom surface transition angle 136 may differ from the inner top surface outlet angle 132. Also, in other embodiments, the outer bottom surface 138 (where the middle and outlet conduit portions 46, 48 meet along the bottom of the conduit 34) may have other shapes, such as concave or convex or flat planar shaped with rounded corners, for example. Likewise, in other embodiments, other corner or edges where other sections meet on the conduit 34 (inside and/or outside) may be rounded or curved.

In the first embodiment, an acute inner bottom surface outlet angle 140 is formed between an inner bottom surface section 142 of the outlet conduit portion 48 and the longitudinal axis 38, as shown in FIG. 3. The inner bottom surface section 142 of the first embodiment has two sub-sections, each with a flat planar shape. In other embodiments (not shown), the inner bottom surface section 142 may be only one uniform section and/or have other shapes, such as being concave or convex or curved, for example. Preferably, a curved transition section 144 is located at the middle portion outlet 78 and connects between the inner bottom surface section 142 of the outlet conduit portion 48 and the lower interior wall 92 of the middle conduit portion 46, as show in FIG. 3. A smooth transition between the middle conduit portion 46 and the outlet portion 48 is important for reducing or preventing the formation of a turbulent vortex in the outlet conduit portion 48. Such a turbulent vortex would create a substantial resistance to the wind flow out of the conduit 34 (through the main outlet opening 56) and this may greatly decrease the turbine's efficiency. Also, a smooth transition provides for a more gradual decrease in pressure as the wind flow is released from the middle conduit portion 46 (as a blade 88 moves past the curved transition section 144). In other embodiments (not shown), there may not be a curved transition section 144 or the curved transition section 144 may have a different shape than that shown in the first embodiment (e.g., different radius of curvature). Also, if the inner bottom surface outlet angle 140 is too large, a turbulent vortex may form at the bottom of the outlet conduit portion 48, which should be avoided to maintain turbine efficiency. It is preferred that the air flow exiting the middle conduit portion 46 sticks to and flows along the curved transition section 144 and the inner bottom surface section 142 of the outlet conduit portion 48 (e.g., to provide laminar type flow) rather than swirling (e.g., turbulent vortex), as this type of flow provides a more efficient flow of the wind out of the conduit 34.

In a preferred construction of the first embodiment, the lower interior wall 92 of the middle conduit portion 46, the curved transition section 144, and the inner bottom surface section 142 of the outlet conduit portion 48 may be formed from a single sheet of metal. However, if the size of the wind turbine is very large (e.g., rotor having a diameter of 10 m, 20 m, or more), it may not be feasible to form these sections 92, 144, 142 from a single sheet (e.g., due to the limitation on the size of sheet metal available and/or the size limitations for the manufacturing machines. Hence in some embodiments or applications, these sections 92, 144, 142 may be formed from separate pieces.

In some embodiments, a middle portion outlet cross-section area of the middle portion outlet 78 may be smaller than the main outlet cross-section area for the main outlet opening 56 (see e.g., FIG. 3).

The inlet conduit portion 44 has a first length 151 along the longitudinal axis 38 (see FIG. 3), the outlet conduit portion 48 has a second length 152 along the longitudinal axis 38, and the middle conduit portion 46 has a third length 153 along the longitudinal axis 38. In the first embodiment, and as is preferred for many applications, the first length 151 (of the inlet portion 44) is about equal to the second length 152 (of the outlet portion 48), and the third length 153 (of the middle portion 46) is about two times that of the first length 151. In general, it will often be desired to make the length of the inlet conduit portion 44 (i.e., the first length 151) and the length of the outlet conduit portion 48 (i.e., the second length 152) to be as short as possible to keep the total length of the turbine 30 as small as possible (e.g., for installation space considerations, for ease of pivoting to face the wind, for lower material cost, etc.). However, it also will often be desired to make the first and second lengths 151, 152 longer for better fluid dynamics of the wind traveling through the turbine 30 (e.g., smooth contraction transition in inlet conduit portion 44, smooth expansion transition in outlet conduit portion 48). Thus, the preferred proportions for the first, second, and third lengths 151, 152, 153 mentioned above may provide a good balance between these conflicting design factors, as has been tested through experimentation. But in other embodiments (not shown), these proportions may be different and the first and second lengths 151, 152 need not be equal.

Referring to FIGS. 4 and 5B, the width 154 of the turbine 30 (and the rotor blades 88) may vary for different applications. In a preferred embodiment where two generators 101, 102 are used, one on each end of the rotor shaft 82 (see e.g., FIGS. 4 and 5B), a preferred width 154 for the turbine 30 is about 1.5 times the rotor diameter. This width 154 may be preferred to provide space for the generators 101, 102 within the diameter of the stand 156 (see e.g., FIG. 5B). In other embodiments, however, the turbine 30 may be wider or narrower than that shown in the first embodiment.

As shown in FIGS. 2–5B, the turbine 30 preferably includes a rotation stand 156 for supporting the conduit 34 (as well as the rotor 80 and generators 101, 102). In the first embodiment, a first support stand portion 157 is attached to the conduit 34 and fixed relative to the conduit 34. The first support stand portion 157 is pivotably and/or rotatably coupled to a second support stand portion 158, preferably via a set of rollers or wheels 159 that are restrained within a track of the second support member 158. Hence, the first support stand portion 157 (along with the conduit 34, rotor 80, and generators 101, 102) is adapted to pivot or rotate about a vertical axis relative the second support stand portion 158. The second support stand portion 158 may be affixed to another object, another structure, a building, or the ground, for example. The turbine 30 may be pivoted/rotated on the stand 156 by an automatically controlled system (not shown) to align the wind turbine 30 with the wind flow 40. One of ordinary skill in the art will likely realize many possible variations for a stand 156 or other fixture(s) to support the turbine 30.

Preferably, the main inlet opening 54 and the main outlet opening 56 each has a safety grill 160 mounted there over (see e.g., FIGS. 2 and 4). The safety grill 160 may be a mesh screen made from metal wire, for example. The grill 160 may be made from any suitable material, including (but not limited to): metal, aluminum, steel, nylon composite, and combinations thereof, for example. Having the blades 88 completely enclosed within the conduit 34 and having the grills 160 over the openings 54, 56 provides several advantages for an embodiment of the present invention, including (but not necessarily limited to): increased safety for persons near the turbine, increased versatility for placement of the turbine during use, and hindering or preventing birds or other foreign objects from entering the turbine. Due to the increased safety provided by an embodiment of the present invention, as compared to prior designs (see e.g., FIG. 1), the turbine 30 typically will not place persons or animals in danger while in close proximity to the turbine 30. This provides a wider array of placement options for installing and operating an embodiment of the present invention. For example, rather than having to mount the wind turbine on a high pedestal or on a high pole structure to keep it away from persons or animals, the turbine may be installed on a roof top of a building, on the ground, and/or between buildings in a downtown region (e.g., where high winds are generated between tall buildings), for example.

Figure 6:
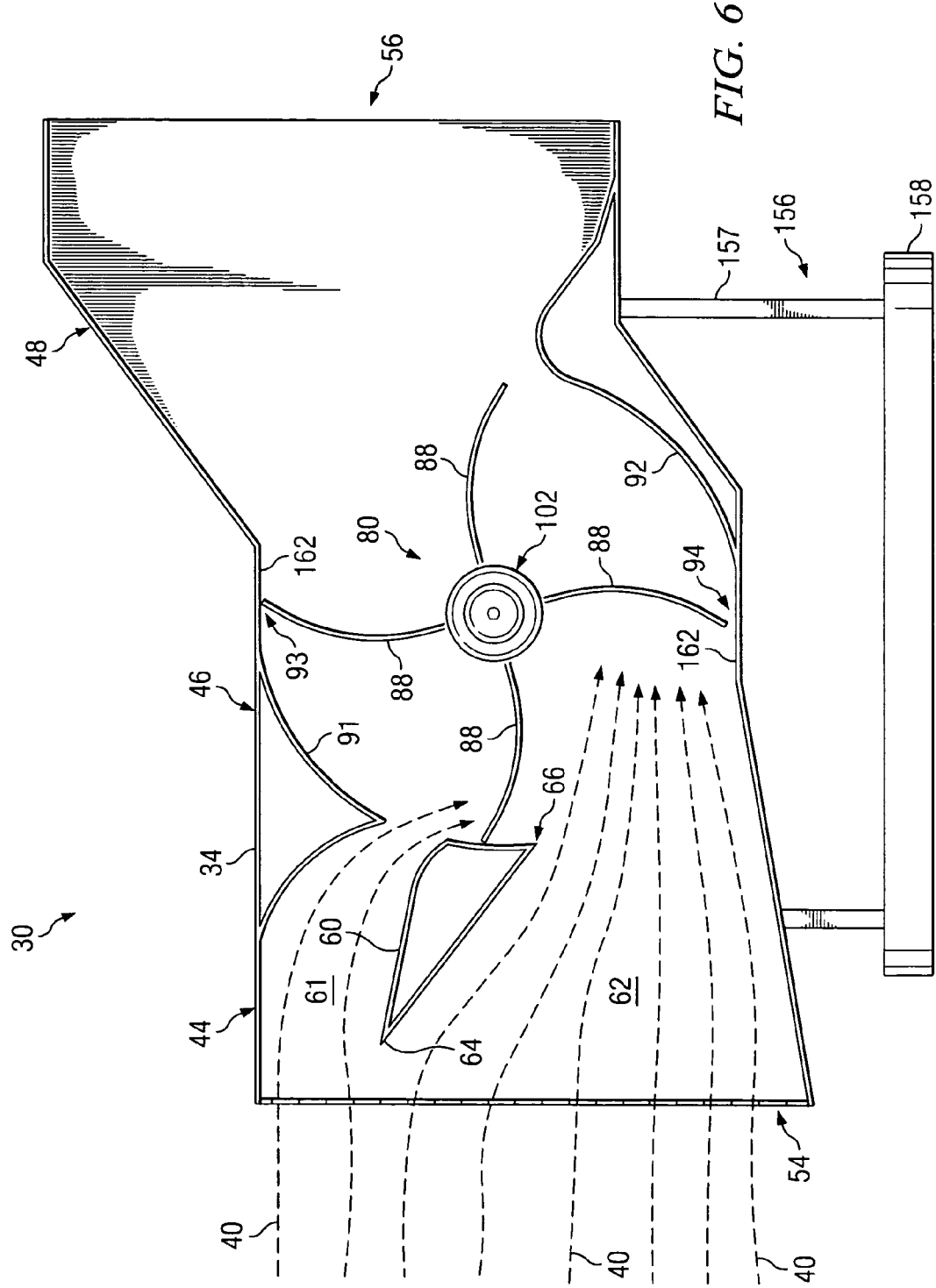
FIG. 6 is side view showing a second embodiment of the present invention.

FIG. 6 is a side view showing a wind powered turbine 30 in accordance with a second embodiment of the present invention. The second embodiment is essentially the same as the first embodiment, except that the rotor 80 has four blades 88. The advantage of four blades versus three blades may be the greater ease of auto-startup or less concern about the stopping position of the rotor for providing auto-startup. Auto-startup refers to the ability for the turbine 30 to be self starting with only wind power, regardless of the rotational position of the rotor 80 when it comes to a rest. However, the use of three blades 88 may be advantageous due to a lighter weight for the rotor 80 (i.e., less inertia for startup), as compared to having four or more blades 88. Also, it may cost less to produce a rotor with three blades than that of a rotor with four or more blades. Furthermore, reducing the weight of the rotor increases turbine efficiency due to less friction on bearings (not shown). Because an embodiment of the present invention is primarily deriving power from the conversion of wind velocity to pressure against the blade (e.g., due to minimized clearance gaps between the blades and the conduit walls) rather than from drag force, it is preferable to use fewer blades (e.g., 2, 3, 4, 5 blades) rather than using more blades (e.g., 8, 10, 12, 30).

In the first embodiment, the use of the splitter 60 to provide the upper and lower sub-tunnels 61, 62, as well as the design of the middle conduit portion 46 and the symmetry of the rotor blades' placement, all contribute to the ability of having a three blade rotor that has auto-startup capabilities, regardless of the stopping position of the rotor 80. These features also contribute to lowering the level of wind velocity needed to achieve a self start of the turbine 30 (e.g., for both the first and second embodiments). The upper sub-tunnel 61 directs an extra portion of the wind flow 40 in a direction generally tangential to the rotor blade 88, which is intended to maximize the extra wind flow contribution by the upper sub-tunnel 61 to driving the turbine. Also, by directing the wind flow 40 from the upper sub-tunnel 61 in a downward direction (see e.g., FIG. 3), it reduces or minimizes the possibility that the wind stream exiting the lower sub-tunnel 62 will flow upward against the normal rotational direction for the rotor 80. This also greatly helps to start-up the wind turbine 30 at low wind speeds. Note that in other embodiments (not shown), there may be more than two sub-tunnels in the inlet conduit portion 44.

Referring to FIGS. 3 and 6, preferably, extended flat portions 162 of the interior walls of the middle conduit portion 46 (upper and lower) are also provided to aid in auto-startup by providing a larger angular range where the rotor 80 may stop while still providing easier auto-startup (i.e., less wind velocity needed to initiate startup). These extended flat portions 162 are especially beneficial for the first embodiment where the rotor 80 has only three blades 88.

During typical use of the first embodiment, wind flowing into the main inlet opening 54 is divided into two parts by the splitter 60 (see e.g., FIG. 3). A majority of the wind entering the conduit 34 is directed through the lower sub-tunnel 62 and into the middle conduit portion 46 to push against the blades 88 of the rotor 80, which causes the rotor 80 to rotate about the rotational axis 84. Another portion of the wind entering the conduit 34 is directed through the upper sub-tunnel 61 and into the middle conduit portion 46, but at a different angle than the wind passing through the lower sub-tunnel 62 (see e.g., FIG. 3). The wind from the upper sub-tunnel 61 also pushes against blades 88 of the rotor 80 for causing the rotor to rotate. As the rotor 80 rotates about the rotational axis 84, the rotor shaft 82 drives the two generators 101, 102. Although the generators 101, 102 are shown being directly coupled to the shaft 82 in the first embodiment, the generator(s) may be indirectly coupled to the rotor shaft (e.g., via belt, via gears) in other embodiments (not shown). As the generator rotors are rotated and driven by the turbine rotor 80, the generators 101, 102 produce electrical power, which may be transmitted to a power grid, storage batteries, or other devices for current or future usage of the electricity.

Figure 7:
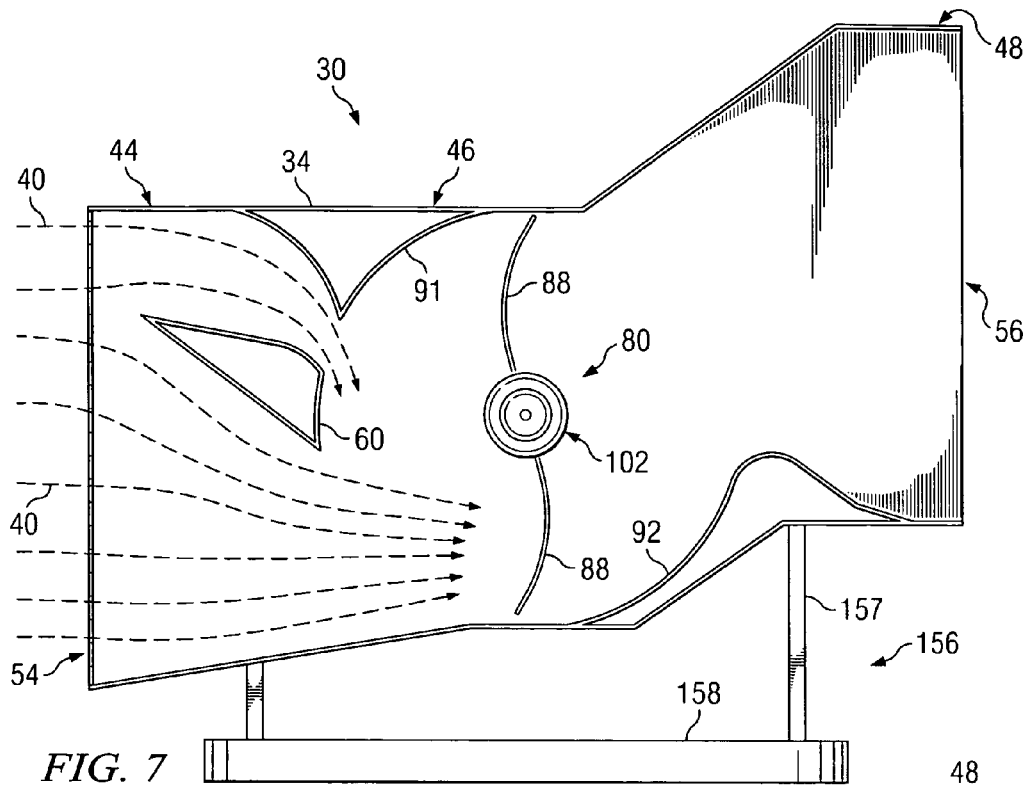
FIGS. 7 and 8 are side views showing a third embodiment of the present invention.
Figure 8:
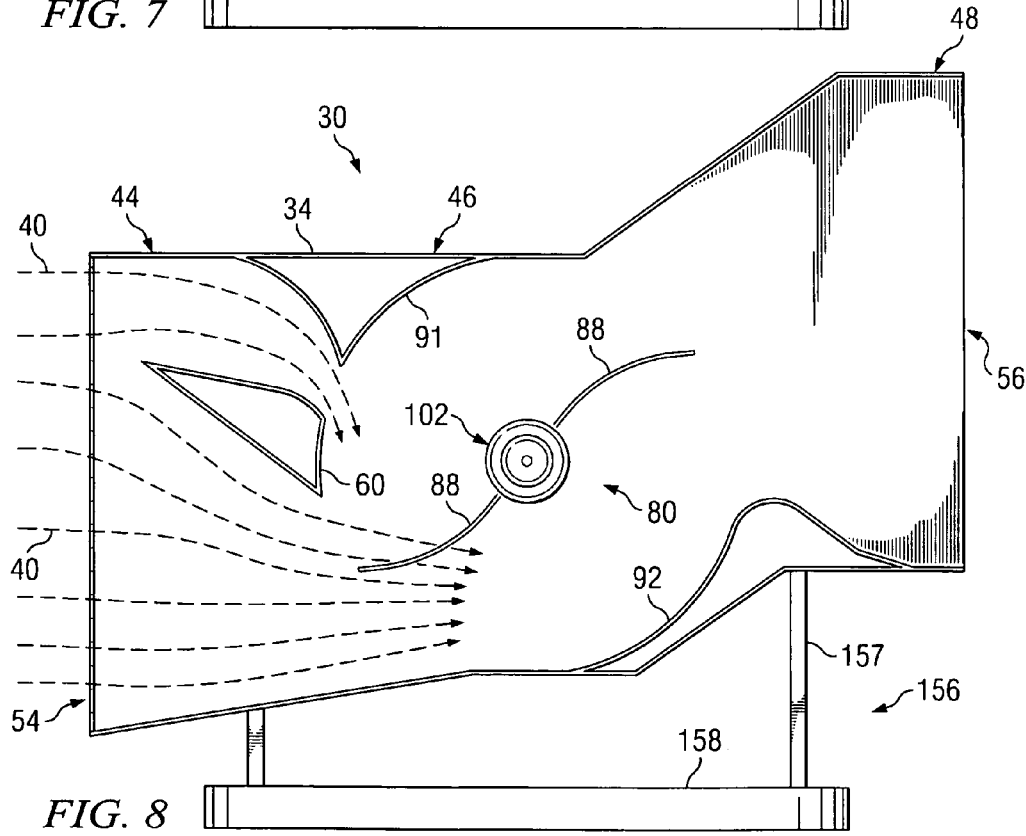

FIGS. 7 and 8 are side views showing a wind powered turbine 30 in accordance with a third embodiment of the present invention. In the third embodiment, two blades 88 are used. This configuration works under certain conditions, but it may have difficulty being self starting (or auto-startup). For example, compare the stopped rotor positions shown in FIGS. 7 and 8. If the rotor 80 comes to a stop in the position shown in FIG. 7, it is more likely that the rotor 80 may be self started by the wind than when the rotor comes to a stop in the position shown in FIG. 8. In the rotor position shown in FIG. 8, the wind is permitted to flow past the top and bottom of the rotor blades 88, which may result in a balancing effect (i.e., no rotation). It may be difficult (i.e., required very high wind velocity) or impossible to obtain a self startup in the rotor position shown in FIG. 8. This problem may be overcome by controlling (e.g., mechanically or electrically) the stopping position of the rotor 80 so that the position shown in FIG. 8 does not occur. Hence, it would be preferred to control the stopping position of the rotor 80 to be like that of FIG. 7. Another way to overcome the auto-startup shortcomings of the third embodiment may be to assist the startup of the turbine 30 with an external power source coupled to the rotor shaft 82 (e.g., electric motor, using the generators as motors momentarily). There may be advantages to having a two bladed rotor 80, as compared to the three or more bladed rotors, such as lower inertia and lower manufacturing cost.

An embodiment of the present invention may have other advantages over prior designs. An embodiment of the present invention may be much quieter during operation than prior designs (see e.g., FIG. 1) because the rotor 80 may spin at a slower rotational speed and/or because the rotor 80 is located within the conduit 34, for example. An embodiment of the present invention, such as the first embodiment, may provide a simple structure (relative to many prior designs) so that it may be built in very large scales at reasonable costs. Hence, the detailed design or an actual embodiment may be kept simple (e.g., few bearings, use of sheet metal), which also provides an advantage of increased mechanical reliability. High reliability thus yields less maintenance (e.g., less maintenance costs, less down time). Also, the balanced design of an embodiment having generators 101, 102 on each side provides advantages of less material needed for structural stability and ease of scalability.

There are numerous locations where an embodiment of the present invention may be installed and operated, including (but not limited to) the following examples: in a field, on a hill top, on a mountain top, on a hill side, on a mountain side, on a roof of a building, on a side of a building, between buildings at any level (e.g., between tall buildings), on a ship, on an offshore oil rig, on a platform on a body of water (e.g., lake, river, ocean), on or next to a water tower, on a utility line structure, proximate to a utility line, on top of a utility plant structure, on top of a chemical plant structure, on top of a storage tank, on top of a dam, on the side of a dam, under a bridge, and on a bridge. With the benefit of this disclosure, one of ordinary skill in the art may realize other placements and/or applications of an embodiment of the present invention.

Although embodiments of the present invention and at least some of its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A wind turbine apparatus comprising:
    a conduit extending along a longitudinal axis of the apparatus, the conduit comprising
        an inlet portion at a first end of the longitudinal axis, the inlet portion having a main inlet opening,
        an outlet portion at a second end of the longitudinal axis, the outlet portion having a main outlet opening, and
        a middle portion located between the inlet and outlet portions, the inlet portion being fluidly connected to the outlet portion via the middle portion;
    a rotor located in the middle portion of the conduit, the rotor comprising
        a shaft extending along a rotational axis through the middle conduit portion, the rotor being adapted to rotate about the rotational axis, wherein the longitudinal axis intersects the rotational axis, wherein a rotor angle formed between the longitudinal axis and the rotational axis is between about 45 degrees and about 135 degrees, and wherein a longitudinal angle formed between the longitudinal axis and an overall wind flow direction for wind flowing through the conduit when the apparatus is being powered by a wind flow is less than about 45 degrees, and
        blades extending from the shaft, the blades being located completely within the middle portion of the conduit;
    a splitter located in the inlet portion of the conduit, so that the inlet portion of the conduit comprises an upper sub-tunnel and a lower sub-tunnel divided by the splitter, wherein the upper and lower sub-tunnels both feed into a middle portion inlet of the middle portion of the conduit, wherein the middle portion inlet is closer to the main inlet opening than a middle portion outlet of the middle portion along the longitudinal axis, and wherein the middle portion outlet is closer to the main outlet opening than the middle portion inlet along the longitudinal axis;
    an upper interior wall of the middle conduit portion having a substantially circular plane shape that is substantially centered at the rotational axis, wherein an upper clearance gap is located between the blades and the upper interior wall of the middle conduit portion when the blades pass thereby; and
    a lower interior wall of the middle conduit portion having a substantially circular plane shape that is substantially centered at the rotational axis, the lower interior wall of the middle conduit portion being opposite and facing the upper interior wall of the middle conduit portion, wherein a lower clearance gap is located between the blades and the lower interior wall of the middle conduit portion when the blades pass thereby, and wherein side clearance gaps are located between sides of the blades and the middle conduit portion.

2. The wind turbine apparatus of claim 1, wherein the splitter is generally wedge-shaped with a smaller leading end thereof located closer to the main inlet opening than a larger trailing end thereof.

3. The wind turbine apparatus of claim 2, wherein an upper inlet cross-section area for an upper inlet of the upper sub-tunnel is larger than an upper outlet cross-section area for an upper outlet of the upper sub-tunnel, the upper inlet of the upper sub-tunnel being located closer to the main inlet opening of the inlet portion than the upper outlet of the upper sub-tunnel, and wherein a lower inlet cross-section area for a lower inlet of the lower sub-tunnel is larger than a lower outlet cross-section area for a lower outlet of the lower sub-tunnel, the lower inlet of the lower sub-tunnel being located closer to the main inlet opening of the inlet portion than the lower outlet of the lower sub-tunnel, and wherein the upper and lower outlets of the upper and lower sub-tunnels both feed into the middle portion of the conduit.

4. The wind turbine apparatus of claim 3, wherein a size of the upper inlet cross-section area is between about 19% and about 35% of the lower inlet cross-section area.

5. The wind turbine apparatus of claim 1, wherein the rotor has a number of blades selected from a group consisting of two, three, four, five, six, seven, and eight.

6. The wind turbine apparatus of claim 1, wherein the upper clearance gap is less than about 10 mm.

7. The wind turbine apparatus of claim 1, wherein the lower clearance gap is less than about 10 mm.

8. The wind turbine apparatus of claim 1, further comprising an outlet centroid of a main outlet cross-section area for the main outlet opening being located higher than an inlet centroid of a main inlet cross-section area for the main inlet opening relative to the rotational axis and relative to the longitudinal axis.

9. The wind turbine apparatus of claim 8, wherein the main outlet cross-section area is about equal to the main inlet cross-section area.

10. The wind turbine apparatus of claim 1, further comprising:

a first electric power generator located outside of a first side of the conduit and rotationally coupled to a first end of the shaft, wherein a first generator rotor of the first electric power generator is adapted to rotate about the rotational axis; and a second electric power generator located outside of a second side of the conduit and rotationally coupled to a second end of the shaft, wherein a second generator rotor of the second electric power generator is adapted to rotate about the rotational axis.

11. The wind turbine apparatus of claim 1, wherein an outer top surface section of the outlet conduit portion is substantially parallel with the longitudinal axis, the outer top surface section having a substantially flat planar shape, and the outer top surface section being proximate to the main outlet opening.

12. The wind turbine apparatus of claim 1, wherein an outer bottom surface section of the outlet conduit portion is substantially parallel with the longitudinal axis, the outer bottom surface section having a substantially flat planar shape, and the outer bottom surface section being proximate to the main outlet opening.

13. The wind turbine apparatus of claim 1, wherein outer side surfaces of the conduit have a substantially flat planar shape and are substantially parallel with the longitudinal axis.

14. The wind turbine apparatus of claim 1, wherein an outer top surface section of the inlet conduit portion is substantially parallel with the longitudinal axis, the outer top surface section having a substantially flat planar shape, and the outer top surface section being proximate to the main inlet opening.

15. The wind turbine apparatus of claim 1, wherein an inner bottom surface inlet angle is formed between an inner bottom surface section of the inlet conduit portion and the longitudinal axis, the inner bottom surface inlet angle being an acute angle, the inner bottom surface section having a substantially flat planar shape, and the inner bottom surface section being proximate to the main inlet opening.

16. The wind turbine apparatus of claim 1, wherein an inner top surface outlet angle is formed between an inner top surface section of the outlet conduit portion and the longitudinal axis, the inner top surface outlet angle being an acute angle, the inner top surface section having a substantially flat planar shape, and the inner top surface section being proximate to the middle conduit portion.

17. The wind turbine apparatus of claim 16, wherein the inner top surface outlet angle is between about 26 degrees and about 39 degrees.

18. The wind turbine apparatus of claim 1, wherein a middle portion outlet cross-section area for a middle portion outlet of the middle conduit portion is smaller than the main outlet cross-section area for the main outlet opening.

19. The wind turbine apparatus of claim 18, wherein an inner bottom surface outlet angle is formed between an inner bottom surface section of the outlet conduit portion and the longitudinal axis, the inner bottom surface outlet angle being an acute angle.

20. The wind turbine apparatus of claim 19, wherein a curved transition section is located at the middle portion outlet and connects between the inner bottom surface section of the outlet conduit portion and the lower interior wall of the middle conduit portion.

21. The wind turbine apparatus of claim 1, further comprising:

a first support stand portion attached to the conduit; and a second support stand portion pivotably coupled to the first support stand portion, the first support stand portion being adapted to pivot about a vertical axis relative to the second support stand portion.

22. The wind turbine apparatus of claim 1, wherein the inlet conduit portion has a first length along the longitudinal axis, the outlet conduit portion has a second length along the longitudinal axis, and the middle conduit portion has a third length along the longitudinal axis, wherein the first length is about equal to the second length, and wherein the third length is about two times that of the first length.

23. The wind turbine apparatus of claim 1, wherein an inner top surface section of the outlet conduit portion is substantially parallel with the longitudinal axis, the inner top surface section having a substantially flat planar shape, and the inner top surface section being proximate to the main outlet opening; and wherein an inner bottom surface section of the outlet conduit portion is substantially parallel with the longitudinal axis and the inner top surface section, the inner bottom surface section having a substantially flat planar shape, and the inner bottom surface section being proximate to the main outlet opening.

24. The wind turbine apparatus of claim 1, wherein the longitudinal angle is about zero degrees and the rotor angle is about 90 degrees.

25. The wind turbine apparatus of claim 1, wherein the side clearance gaps, the upper clearance gap, and the lower clearance gap are about the same size.

26. The wind turbine apparatus of claim 1, wherein the side clearance gaps are each less than about 10 mm.

27. A wind turbine apparatus comprising:
a conduit extending along a generally horizontal longitudinal axis of the apparatus, the conduit comprising
an inlet portion at a first end of the longitudinal axis, the inlet portion having a main inlet opening,
an outlet portion at a second end of the longitudinal axis, the outlet portion having a main outlet opening, and
a middle portion located between the inlet and outlet portions, the inlet portion being fluidly connected to the outlet portion via the middle portion;
a rotor located in the middle portion of the conduit, the rotor comprising
a shaft extending along a rotational axis through the middle conduit portion, the rotor being adapted to rotate about the rotational axis, wherein the longitudinal axis intersects the rotational axis, wherein a rotor angle formed between the longitudinal axis and the rotational axis is between about 45 degrees and about 135 degrees, and wherein a longitudinal angle formed between the longitudinal axis and an overall wind flow direction for wind flowing through the conduit when the apparatus is being powered by a wind flow is less than about 45 degrees, and
blades extending from the shaft, the blades being located completely within the middle portion of the conduit;
a splitter located in the inlet portion of the conduit, so that the inlet portion of the conduit comprises an upper sub-tunnel and a lower sub-tunnel divided by the splitter, the splitter being generally wedge-shaped with a smaller leading end thereof located closer to the main inlet opening than a larger trailing end thereof,
wherein an upper inlet cross-section area for an upper inlet of the upper sub-tunnel is larger than an upper outlet cross-section area for an upper outlet of the upper sub-tunnel, the upper inlet of the upper sub-tunnel being located closer to the main inlet opening of the inlet portion than the upper outlet of the upper sub-tunnel,
wherein a lower inlet cross-section area for a lower inlet of the lower sub-tunnel is larger than a lower outlet cross-section area for a lower outlet of the lower sub-tunnel, the lower inlet of the lower sub-tunnel being located closer to the main inlet opening of the inlet portion than the lower outlet of the lower sub-tunnel, and
wherein the upper and lower outlets of the upper and lower sub-tunnels both feed into a middle portion inlet of the middle portion of the conduit, wherein the middle portion inlet is closer to the main inlet opening than a middle portion outlet of the middle portion along the longitudinal axis, and wherein the middle portion outlet is closer to the main outlet opening than the middle portion inlet along the longitudinal axis;
an upper interior wall of the middle conduit portion having a substantially circular plane shape that is substantially centered at the rotational axis, wherein an upper clearance gap is located between the blades and the upper interior wall of the middle conduit portion when the blades pass thereby;
a lower interior wall of the middle conduit portion having a substantially circular plane shape that is substantially centered at the rotational axis, the lower interior wall of the middle conduit portion being opposite and facing the upper interior wall of the middle conduit portion, wherein a lower clearance gap is located between the blades and the lower interior wall of the middle conduit portion when the blades pass thereby, and wherein side clearance gaps are located between sides of the blades and the middle conduit portion; and
an outlet centroid of a main outlet cross-section area for the main outlet opening being located higher than an inlet centroid of a main inlet cross-section area for the main inlet opening relative to the rotational axis and relative to the longitudinal axis.

28. A wind turbine apparatus comprising:
a conduit extending along a generally horizontal longitudinal axis of the apparatus, the conduit comprising
an inlet portion at a first end of the longitudinal axis, the inlet portion having a main inlet opening,
an outlet portion at a second end of the longitudinal axis, the outlet portion having a main outlet opening, and
a middle portion located between the inlet and outlet portions, the inlet portion being fluidly connected to the outlet portion via the middle portion;
a rotor located in the middle portion of the conduit, the rotor comprising
a shaft extending along a rotational axis through the middle conduit portion, the rotor being adapted to rotate about the rotational axis, wherein the longitudinal axis intersects the rotational axis, wherein a rotor angle formed between the longitudinal axis and the rotational axis is between about 45 degrees and about 135 degrees, and wherein a longitudinal angle formed between the longitudinal axis and an overall wind flow direction for wind flowing through the conduit when the apparatus is being powered by a wind flow is less than about 45 degrees, and
blades extending from the shaft, the blades being located completely within the middle portion of the conduit;
a splitter located in the inlet portion of the conduit, so that the inlet portion of the conduit comprises an upper sub-tunnel and a lower sub-tunnel divided by the splitter, the splitter being generally wedge-shaped with a smaller leading end thereof located closer to the main inlet opening than a larger trailing end thereof,
wherein an upper inlet cross-section area for an upper inlet of the upper sub-tunnel is larger than an upper outlet cross-section area for an upper outlet of the upper sub-tunnel, the upper inlet of the upper sub-tunnel being located closer to the main inlet opening of the inlet portion than the upper outlet of the upper sub-tunnel,
wherein a lower inlet cross-section area for a lower inlet of the lower sub-tunnel is larger than a lower outlet cross-section area for a lower outlet of the lower sub-tunnel, the lower inlet of the lower sub-tunnel being located closer to the main inlet opening of the inlet portion than the lower outlet of the lower sub-tunnel, and
wherein the upper and lower outlets of the upper and lower sub-tunnels both feed into a middle portion inlet of the middle portion of the conduit, wherein the middle portion inlet is closer to the main inlet opening than a middle portion outlet of the middle portion along the longitudinal axis, and wherein the middle portion outlet is closer to the main outlet opening than the middle portion inlet along the longitudinal axis;
an upper interior wall of the middle conduit portion having a substantially circular plane shape that is substantially centered at the rotational axis, wherein an upper clearance gap is located between the blades and the upper interior wall of the middle conduit portion when the blades pass thereby;

a lower interior wall of the middle conduit portion having a substantially circular plane shape that is substantially centered at the rotational axis, the lower interior wall of the middle conduit portion being opposite and facing the upper interior wall of the middle conduit portion, wherein a lower clearance gap is located between the blades and the lower interior wall of the middle conduit portion when the blades pass thereby, and wherein side clearance gaps are located between sides of the blades and the middle conduit portion;

an outlet centroid of a main outlet cross-section area for the main outlet opening being located higher than an inlet centroid of a main inlet cross-section area for the main inlet opening relative to the rotational axis and relative to the longitudinal axis;

a first electric power generator located outside of a first side of the conduit and rotationally coupled to a first end of the shaft, wherein a first generator rotor of the first electric power generator is adapted to rotate about the rotational axis; and a second electric power generator located outside of a second side of the conduit and rotationally coupled to a second end of the shaft, wherein a second generator rotor of the second electric power generator is adapted to rotate about the rotational axis.

29. A wind turbine apparatus comprising:

a conduit extending along a longitudinal axis of the apparatus, the conduit comprising an inlet portion at a first end of the longitudinal axis, the inlet portion having a main inlet opening, an outlet portion at a second end of the longitudinal axis, the outlet portion having a main outlet opening, and a middle portion located between the inlet and outlet portions, the inlet portion being fluidly connected to the outlet portion via the middle portion;

a rotor located in the middle portion of the conduit, the rotor comprising a shaft extending along a rotational axis through the middle conduit portion, the rotor being adapted to rotate about the rotational axis, wherein the longitudinal axis intersects the rotational axis, wherein a rotor angle formed between the longitudinal axis and the rotational axis is between about 45 degrees and about 135 degrees, and wherein a longitudinal angle formed between the longitudinal axis and an overall wind flow direction for wind flowing through the conduit when the apparatus is being powered by a wind flow is less than about 45 degrees, and blades extending from the shaft, the blades being located completely within the middle portion of the conduit;

an upper interior wall of the middle conduit portion having a substantially circular plane shape that is substantially centered at the rotational axis, wherein an upper clearance gap is located between the blades and the upper interior wall of the middle conduit portion when the blades pass thereby;

a lower interior wall of the middle conduit portion having a substantially circular plane shape that is substantially centered at the rotational axis, the lower interior wall of the middle conduit portion being opposite and facing the upper interior wall of the middle conduit portion, wherein a lower clearance gap is located between the blades and the lower interior wall of the middle conduit portion when the blades pass thereby;

a first electric power generator located outside of a first side of the conduit and rotationally coupled to a first end of the shaft, wherein a first generator rotor of the first electric power generator is adapted to rotate about the rotational axis; and a second electric power generator located outside of a second side of the conduit and rotationally coupled to a second end of the shaft, wherein a second generator rotor of the second electric power generator is adapted to rotate about the rotational axis.

30. A wind turbine apparatus comprising:

a conduit extending along a longitudinal axis of the apparatus, the conduit comprising an inlet portion at a first end of the longitudinal axis, the inlet portion having a main inlet opening, an outlet portion at a second end of the longitudinal axis, the outlet portion having a main outlet opening, and a middle portion located between the inlet and outlet portions, the inlet portion being fluidly connected to the outlet portion via the middle portion;

a rotor located in the middle portion of the conduit, the rotor comprising a shaft extending along a rotational axis through the middle conduit portion, the rotor being adapted to rotate about the rotational axis, wherein the longitudinal axis intersects the rotational axis, wherein a rotor angle formed between the longitudinal axis and the rotational axis is between about 45 degrees and about 135 degrees, and wherein a longitudinal angle formed between the longitudinal axis and an overall wind flow direction for wind flowing through the conduit when the apparatus is being powered by a wind flow is less than about 45 degrees, and blades extending from the shaft, the blades being located completely within the middle portion of the conduit;

an upper interior wall of the middle conduit portion having a substantially circular plane shape that is substantially centered at the rotational axis, wherein an upper clearance gap is located between the blades and the upper interior wall of the middle conduit portion when the blades pass thereby, wherein the upper clearance gap is less than about 10 mm; and a lower interior wall of the middle conduit portion having a substantially circular plane shape that is substantially centered at the rotational axis, the lower interior wall of the middle conduit portion being opposite and facing the upper interior wall of the middle conduit portion, wherein a lower clearance gap is located between the blades and the lower interior wall of the middle conduit portion when the blades pass thereby, wherein the lower clearance gap is less than about 10 mm, and wherein side clearance gaps of less than about 10 mm are located between sides of the blades and the middle conduit portion.

31. The wind turbine apparatus of claim 30, wherein the rotor has a diameter of less than about 2 meters, wherein the upper clearance gap is less than about 3 mm, wherein the lower clearance gap is less than about 3 mm, and wherein each of the side clearance gaps is less than about 3 mm.

32. The wind turbine apparatus of claim 30, wherein the rotor has a diameter of less than about 3 meters, wherein the upper clearance gap is less than about 5 mm, wherein the lower clearance gap is less than about 5 mm, and wherein each of the side clearance gaps is less than about 5 mm.

* * * * *